(12) United States Patent
Parra Moyano et al.

(10) Patent No.: US 7,215,753 B2
(45) Date of Patent: May 8, 2007

(54) PERSONAL COMMUNICATION SYSTEM

(75) Inventors: Francisco Parra Moyano, Madrid (ES); Javier Perez Fernandez, Madrid (ES); Cristina Ruiz Balmaseda, Las Matas (ES); Fernando Inigo Torre, Leganes (ES); Javier Arauz Rosado, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1157 days.

(21) Appl. No.: 09/973,824

(22) Filed: Oct. 11, 2001

(65) Prior Publication Data

US 2002/0051519 A1 May 2, 2002

Related U.S. Application Data

(63) Continuation of application No. PCT/EP00/03133, filed on Oct. 19, 2000.

(30) Foreign Application Priority Data

Apr. 12, 1999 (DE) ................................. 199 16 359

(51) Int. Cl.
H04M 3/42 (2006.01)
(52) U.S. Cl. ..................... 379/211.02; 379/201.03; 370/356; 455/414.2
(58) Field of Classification Search ............. 379/88.02, 379/93.23, 201.03, 211.02, 211.03, 265.11; 455/414.2; 370/356
See application file for complete search history.

(56) References Cited

U.S. PATENT DOCUMENTS

| | | | |
|---|---|---|---|
| 4,313,035 A | 1/1982 | Jordan et al. | |
| 5,329,578 A | 7/1994 | Brennan et al. | |
| 5,392,342 A | * 2/1995 | Rosenthal | ............... 379/211.03 |
| 5,550,907 A | 8/1996 | Carlsen | |
| 5,706,339 A | 1/1998 | Eisdorfer et al. | |
| 5,717,741 A | 2/1998 | Yue et al. | |
| 5,724,411 A | 3/1998 | Eisdorfer et al. | |
| 5,841,854 A | 11/1998 | Schumacher et al. | |
| 5,905,789 A | 5/1999 | Will | |
| 5,933,483 A | 8/1999 | Pellegrino et al. | |
| 6,263,064 B1 | * 7/2001 | O'Neal et al. | ......... 379/201.03 |

FOREIGN PATENT DOCUMENTS

| | | |
|---|---|---|
| EP | 0302282 A1 | 2/1989 |
| EP | 0719059 A2 | 6/1996 |
| WO | WO91/07838 | 5/1991 |
| WO | WO93/18606 | 9/1993 |

(Continued)

Primary Examiner—Gerald Gauthier

(57) ABSTRACT

The invention relates to a PCS-server of a personal communication system providing personal telephone numbers for PCS subscribers. A PCS subscriber can send a handling message to the PCS-server and can form a specific handling of one or more destination profiles stored in a destination profile memory. The specific handling relates to the specific selection and activation/deactivation or switching between specific destination profiles or to the setting of specific call distribution criteria in the destination profiles. The call distribution criteria relate to origin parameter teleservice-type parameters, busy option parameters and number of call parameters. The PCS subscriber can therefore flexibly configure and use the destination profiles allocated to his personal telephone number. Based on the selected call distribution criteria a flexible delivery of the calls by using the so-set destination profiles is possible.

71 Claims, 19 Drawing Sheets

FOREIGN PATENT DOCUMENTS

| | | |
|---|---|---|
| WO | WO94/06236 | 3/1994 |
| WO | WO94/29992 | 12/1994 |
| WO | WO96/21329 | 7/1996 |
| WO | WO97/20423 | 6/1997 |
| WO | WO97/37499 | 10/1997 |
| WO | WO98/38781 | 9/1998 |

* cited by examiner

*FIG. 5a* PRINCIPLE OF THE INVENTION

PRINCIPLE OF THE INVENTION

FIRST EMBODIMENT

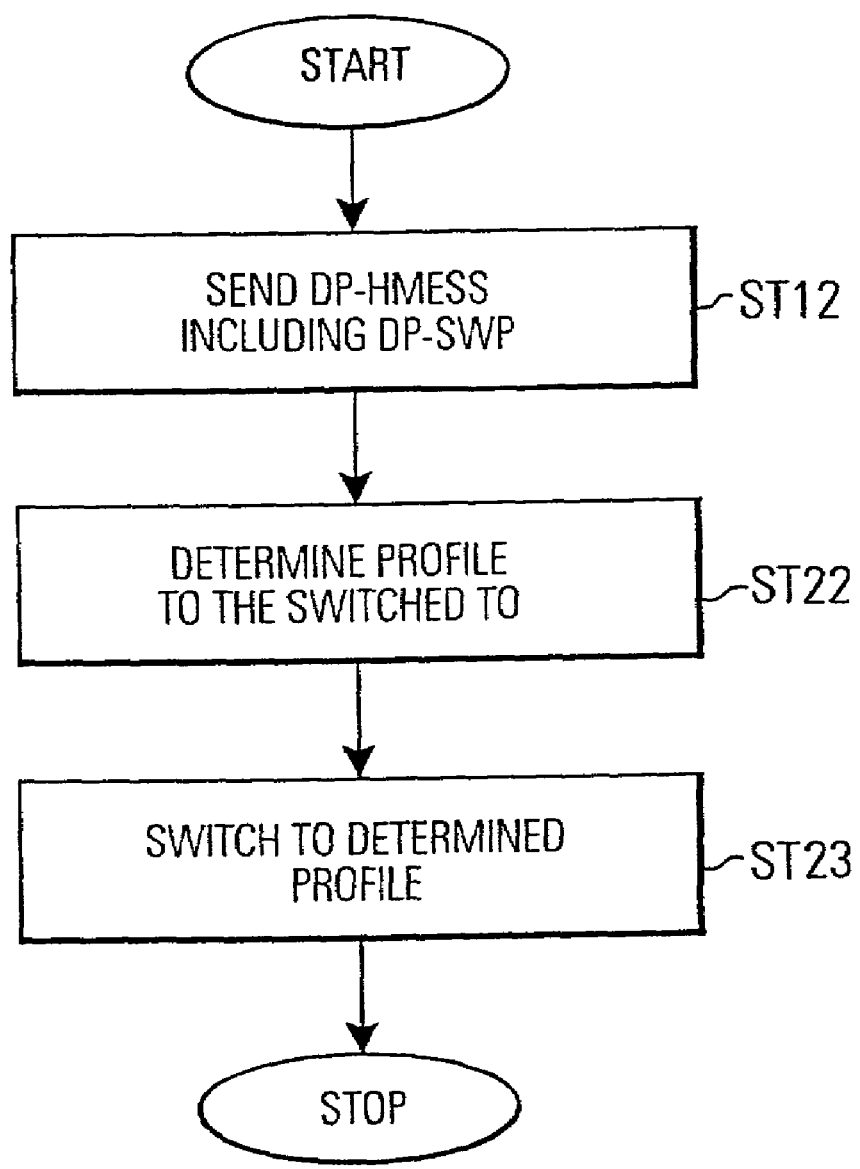

*FIG. 7a* THIRD EMBODIMENT

FIG.8
THIRD TO SEVENTH EMBODIMENTS

DP

| NO. | DESTINATION LOC. (NUMBER) | PTN ORGP PARAMETER | TELEP PARAMETER | BOP PARAMETER | NOCP PARAMETER | NOCF FLAG |
|---|---|---|---|---|---|---|
| 1 | PDN1 | ONLY 089 | FAX | 3 | ONE CALL | SET |
| 2 | PDN2 | NOT COMPANY | VIDEO | 3 | ONE CALL | NOT SET |
| 3 | PDN3 | ONLY 0221 | FAX | GIRE BUSY | MORE CALLS | SET |
| .... | .... | .... | .... | .... | .... | .... |
| N | PDN | ALL ORIGINS | ALL TYPES | N | MORE CALLS | SET |

*FIG.9a* FOURTH EMBODIMENT
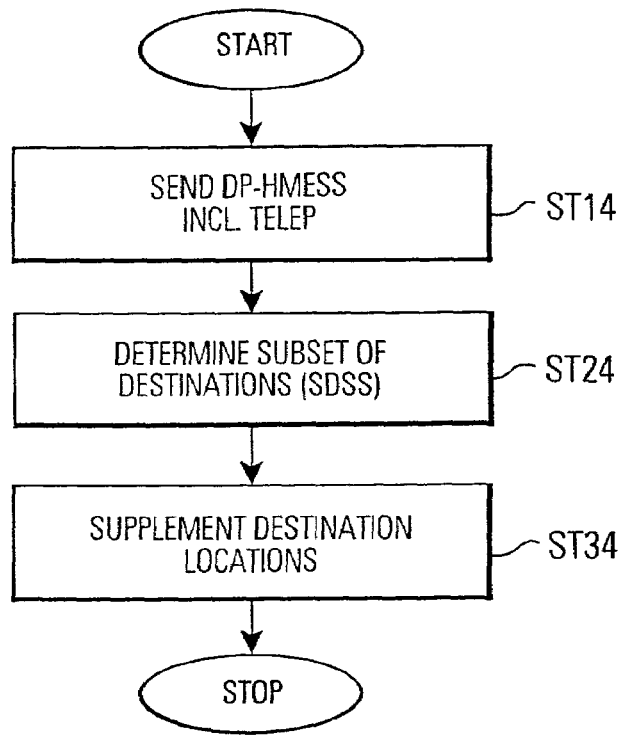
*FIG.9b*
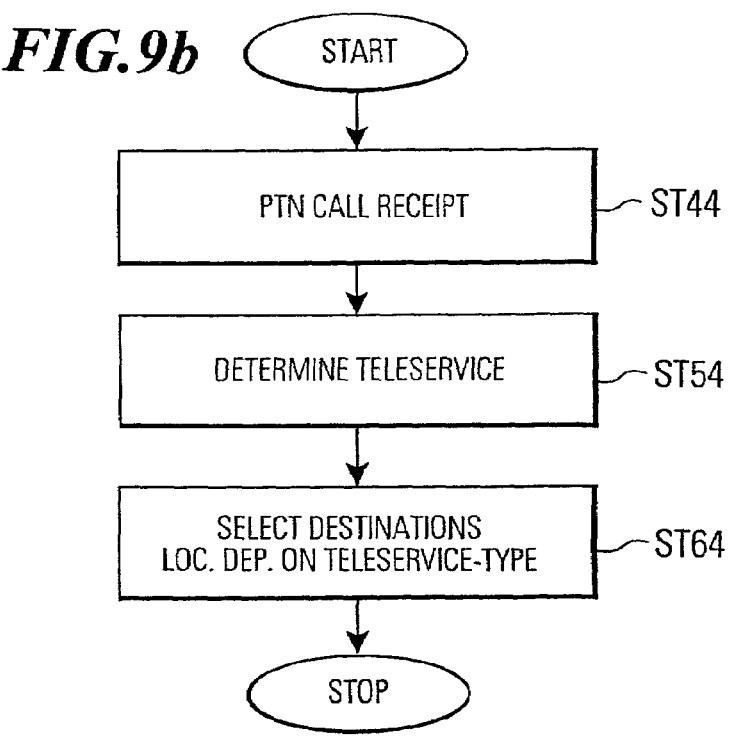

*FIG.10a* FIFTH EMBODIMENT

FIG.10c
FIFTH EMBODIMENT

DP'

| SEQ. NO. | DESTINATION | BUSY OPTION |
|---|---|---|
| 1 | EXTENSION X | 6 |
| 2 | EXTENSION Y | GIVE BUSY |
| 3 | DECT PHONE | 6 |
| 4 | MOBILE PHONE | 6 |
| 5 | HOME | 6 |
| 6 | SECRETARY 1 | 7 |
| 7 | SECRETARY 2 | 8 |
| 8 | VOICE MAIL | GIVE BUSY |

FIG.11a SIXTH EMBODIMENT
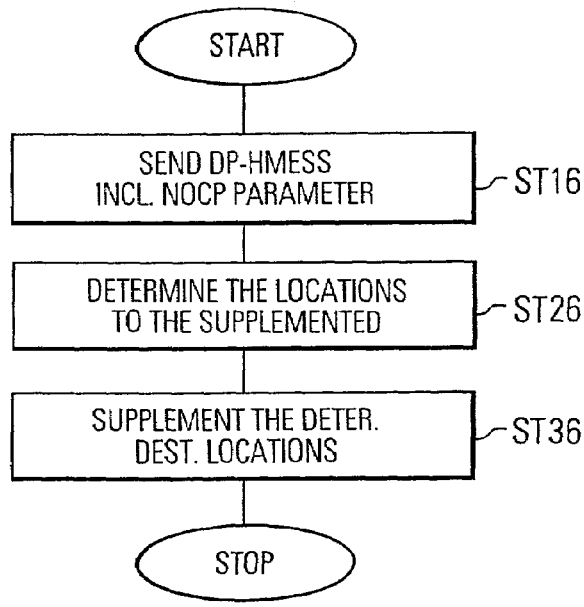
FIG.11b
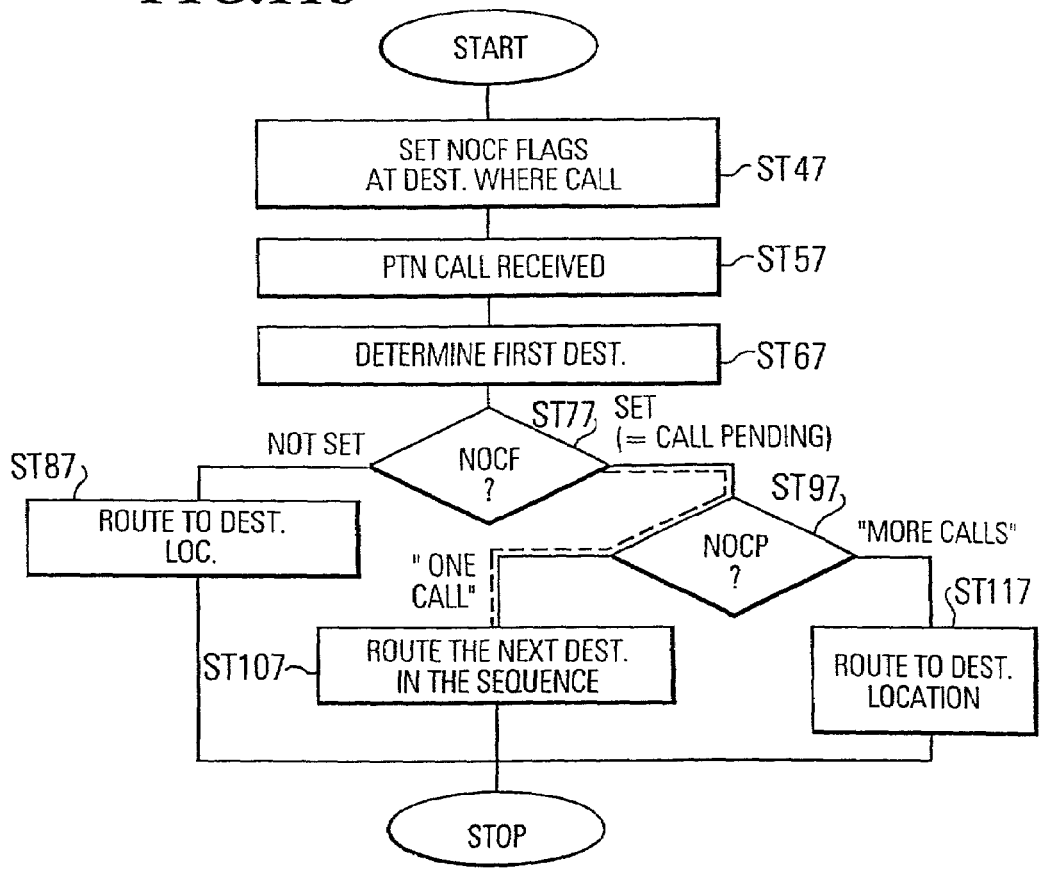

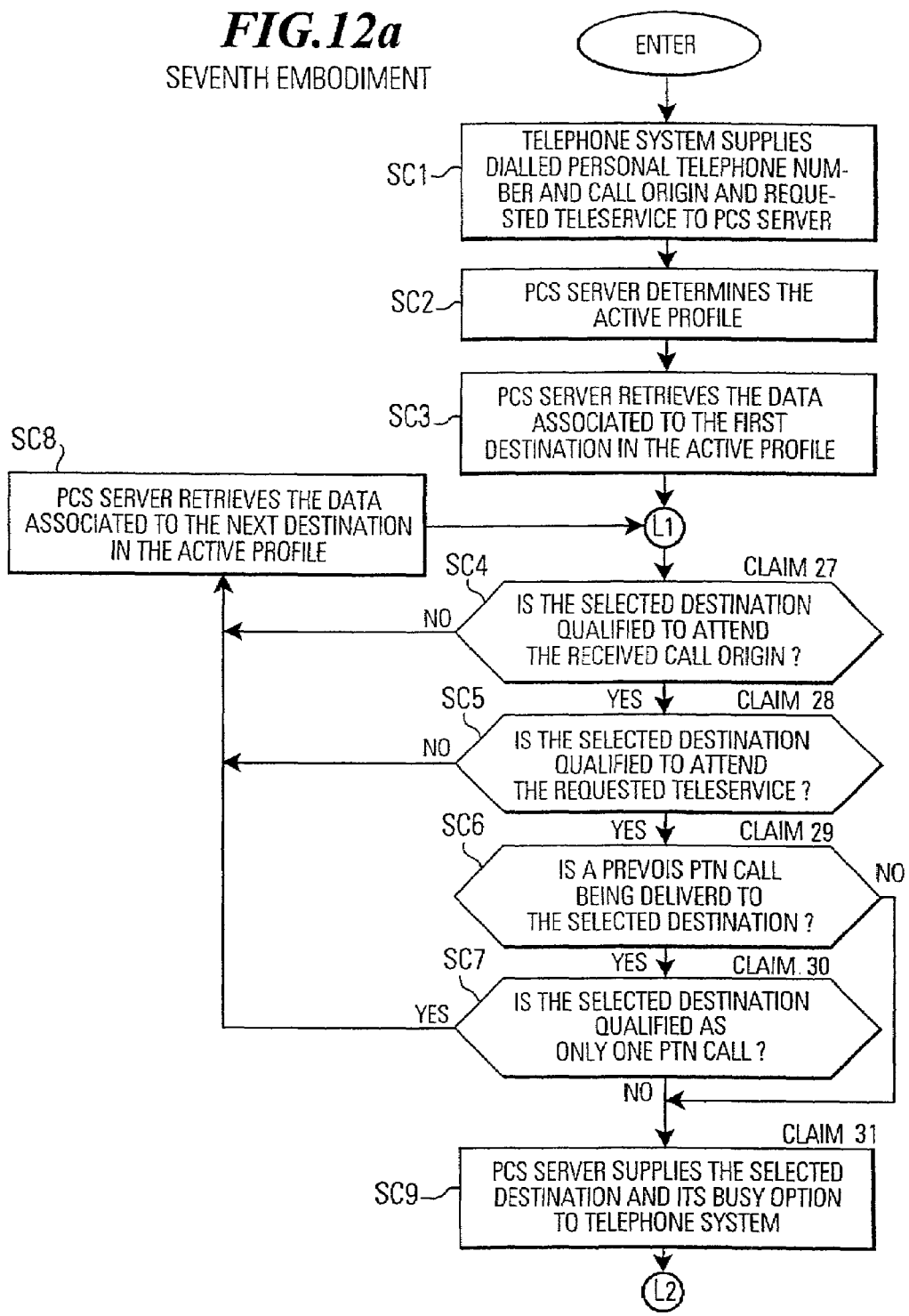

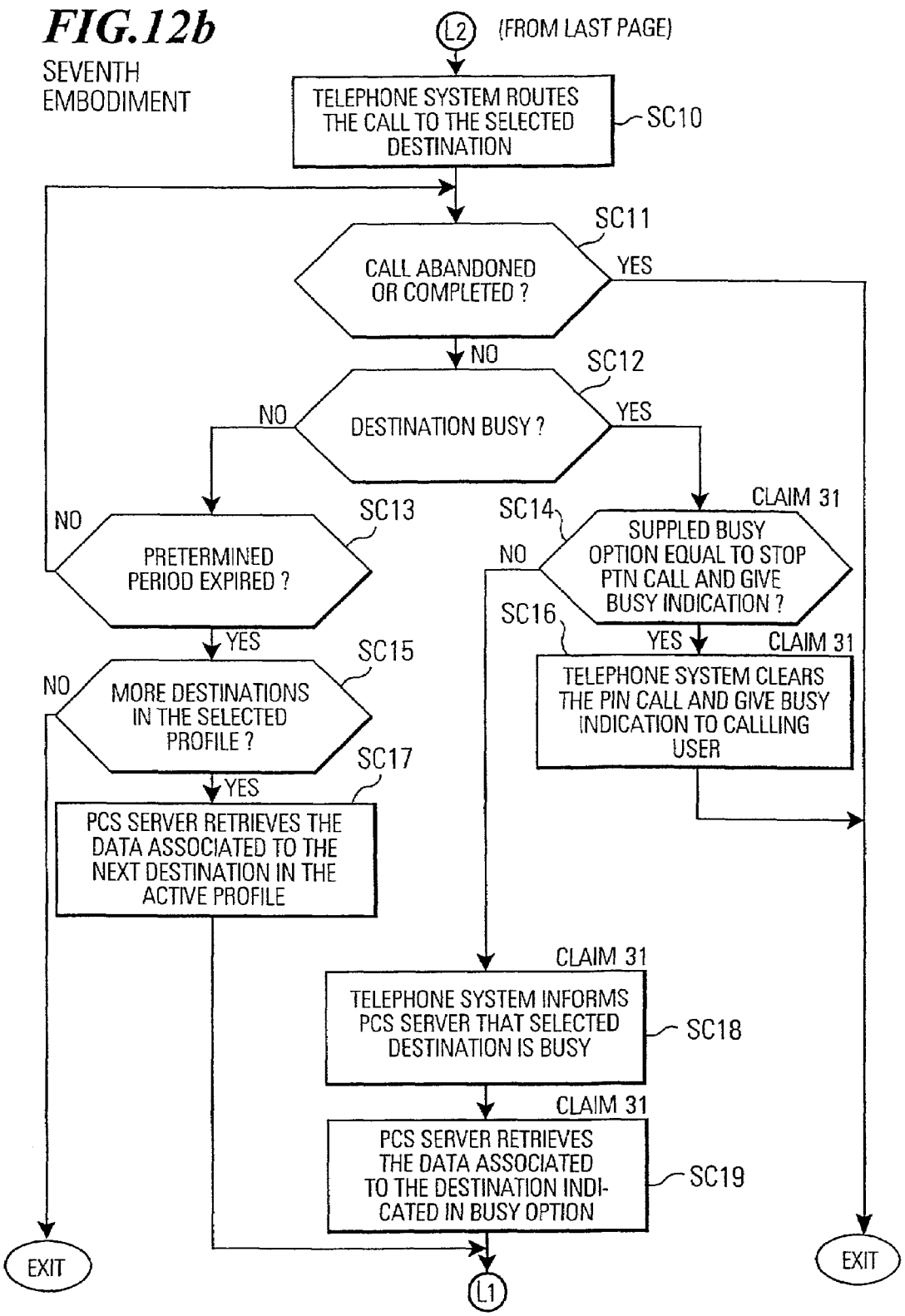

PERSONAL COMMUNICATION SYSTEM

This application is a continuation of International Application No. PCT/EP00/03133 filed on Apr. 7, 2000, which International Application was published by the International Bureau in English on Oct. 19, 2000.

FIELD OF THE INVENTION

The present invention relates to a personal communication system (hereinafter abbreviated PCS) server of a personal communication system providing PCS subscribers with personal telephone numbers. The present invention also relates to a method for handling or controlling such a personal communication system server.

In particular, the present invention relates to a PCS server which comprises a PCS distribution (i.e. delivery) or routing means for completing an incoming PCS call directed to the PTN by routing the incoming call sequentially to each destination location in accordance with a sequence of destination locations as indicated in a destination profile stored in a PCS destination profile memory.

The invention in particular relates to the problem how the incoming PCS call can be distributed or routed to the respective destination locations very flexibly using a number of different call distribution criteria and the setting and selection or activation/deactivation of destination profiles with such call distribution criteria.

BACKGROUND OF THE INVENTION

Some telephone systems now offer a personal communication service (PCS) to their subscribers. As shown in FIG. 1, a PCS server PCS-SERV of a personal communication system comprises a PCS destination profile memory DP-MEM storing in association with at least one personal telephone number PTN a number M of destination profiles DPm respectively consisting of an ordered sequence of destination numbers PDNn indicating a number N of predetermined destination locations. A PCS routing means PCS-RM is provided for completing an incoming call directed to a set PTN by routing the incoming call sequentially to each destination location in accordance with the sequence indicated in the respective destination profile until a call is abandoned or answered. That is, if a PTN call is directed to the PCS routing means, a destination number PTN from an active destination profile is requested and the active destination profile, e.g. DP1, then provides sequentially the destination location numbers $PDN1_1$, $PDN2_1$, $PDN3_1$ . . . $PDNN_1$ to the PCS routing means according to the predetermined sequence as indicated by the entry in the left hand column of the respective active destination profile, e.g. DP1.

Various operation principles can be used for the interaction between the PCS routing means PCS-RM and the destination profile memory DP-MEM when routing the call to the predetermined destination locations.

That is, when a call is delivered to the selected destination as indicated by the destination number PDN and the call is not answered in a predetermined period of time, then the call is removed from that destination, the destination profile memory DP-MEM provides the next destination location number PDN and the call is delivered to the next destination location in the predetermined sequence as indicated in the active destination profile DP. This relates to the situation where a single PTN call is directed to the PCS server PCS-SERV and the call is sequentially routed to the individual destination locations. In this case, once the PTN call has been accepted for processing by the PCS routing means PCS-RM, the personal telephone number PTN associated to the PCS subscriber is marked busy and no further possibly simultaneous PTN call is processed.

Alternatively, there is the possibility that several simultaneous calls directed to the same PTN number are processed at the same time. If one PTN call has already been delivered to a destination location, then this destination location is busy either because the PTN call is pending there or is actually answered (i.e. the call has been completed to the called party at this destination location). If a further PTN call is directed to the same destination location which is now busy, the further PTN call is delivered to the next destination in the sequence as indicated by the active destination location profile. Thus, even a number of simultaneous incoming PTN calls can be sequentially routed or distributed (i.e. delivered) according to the same active destination profile until all incoming PTN calls are being answered or delivered.

An example of a personal communication system using such an active destination profile for the routing of a single incoming call is shown in FIG. 2. As shown in FIG. 2 each of the destinations 1, 2, . . . , n−2, n−1, N is associated with a specific destination number PDN respectively relating to the user desk telephone, a DECT telephone, a GSM mobile telephone, a home telephone or a voice mail system. A personal telephone number PTN "913392872" has been provided to the PCS subscriber and any incoming call directed to this personal telephone number is sequentially routed to the user desk telephone, the DECT telephone, the GSM mobile telephone, the home telephone and the voice mail system until the call is answered by the called party at one of the destination locations.

There are various possibilities how such a personal communication service PCS can be implemented e.g. by a telephone system. The personal communication service may be provided in a private environment like a private branch exchange PBX or a PBX network. The personal communication service can also be implemented in a public environment, e.g. provided as an intelligent network IN service in a fixed telephone network or a mobile radio telephone network. Depending on the implementation the PCS server may have different locations. The PCS server may be integrated in the exchange software or located in an external device connected to the exchange. The PCS server may also be distributed amongst all nodes or provided by a specific node in the telephone system. If it is distributed over the number of nodes, the PCS server does not have a specific predetermined location.

Furthermore, the PCS routing means, which is responsible for completing an incoming call directed to the personal telephone number PTN by routing the incoming call sequentially to each destination location indicated in an active destination profile, can be implemented in various ways. One possibility is that the PCS routing means PCS-RM sets up a basic call to the determined destination location once the destination number PDN has been provided by the destination profile memory DP-MEM. In this case, a new call will be set up to each destination location sequentially. Alternatively, the PCS routing means PCS-RM can activate a service (provided by the network) which allows a call forwarding.

The principles of using different call distribution criteria for distributing calls in association with destination profiles according to the invention (as explained below) can be implemented independent of the scenario of the location and the routing method used by the PCS server of the personal communication service PCS. Hereinafter, a few examples of implementations of the personal communication service PCS to which the invention can be applied are discussed with reference to FIGS. 3a–d.

FIG. 3a is an example of a PCS server integrated in a private branch exchange (PBX) software. The PCS application (the PCS software and data base) implemented in association with the user profile DP (e.g. included in the PCS-MEM) receives the dialed PTN number in step S2 from the PCS routing means PCS-RM after the PCS-RM receives the dialed user number from the calling user in step S1. More specifically, a call monitor means CM of the PCS routing means PCS-RM forwards the PTN number to the PCS application. The PCS application returns the selected destination in step S3 according to the active destination profile. In step S4 the routing means PCS-RM distributes the call to the selected destination.

FIG. 3b is an example of a PCS server integrated in a PBX software in case of a network call. In step S1 a calling user dials the PTN user number which is directed to the first exchange PBX1 of the PBX network. The user associated with the dialed user number has a subscription in the exchange PBX2. Therefore, in step S2 the dialed user number is directed to the exchange PBX2. In the exchange PBX2 the call monitoring unit of the PCS routing means returns in step S3 the selected destination according to an active destination profile. In step S4 the call is distributed to the third exchange PBX3 where the selected destination is connected. In this case the selected destination is not connected to the first exchange PBX1 to which the call was first routed in step S1. Therefore, the selected destination number is returned to the first exchange PBX1 and the call routing or call forwarding is started from the first exchange PBX1. In FIG. 3b the PCS routing means can be viewed as being provided in the first exchange PBX1 whilst the call monitoring unit of the PCS routing means as well as the destination profiles are provided in the second exchange PBX2.

FIG. 3c shows an example of a PCS server integrated in the software of a home location register HLR in a public land mobile network PLMN. A calling user, e.g. from a fixed network PSTN, dials a user number in step S1 which is received by the gateway switching center GMSC of the mobile network. The GMSC provides the dialed user number in step S2 to the home location register HLR. The PCS server implemented in the home location register HLR receives the dialed user number and returns in step S3 the selected destination according to the active destination profile. The HLR returns the information to the GMSC to route the call to the selected destination MSC/VLR in step S4. In this case the PCS destination profile memory can be visualized as being incorporated in the home location register HLR whilst the PCS routing means uses the facilities provided by the GMSC for routing the call to the predetermined destination location number.

FIG. 3d is an example of an implementation of a PCS server as part of the intelligent network. A service switching point SSP receives in step S1 the dialed user number from the fixed network PSTN (Public Switch Telephone Network) and sends it in step S2 to the service control point SCP. In the service control point SCP the PCS application receives the dialed number and returns the selected destination in accordance with the destination profile. In step S3 the destination to distribute the call is provided to the service switching point SSP and in step S4 the service switching point SSP routes the call to the selected destination, e.g. to a gateway mobile switching center of a PLMN network, if the selected destination is part of such a mobile network PLMN. In this case, the PCS destination profile memory can be provided by the service control point SCP whilst the PCS routing means is implemented by parts of the service switching point SSP and the respective networks used for routing the call, e.g. by the GMSC of the PLMN.

As explained above, the present invention can be used for any implementation of the PCS server, e.g. in the scenarios shown in FIGS. 3a–3d. However, also other implementations are possible in accordance with the network configuration and the routing facilities. In this connection, several factors may be considered in a personal communication system PCS, e.g. the time spent by the PCS until the call is completed (answered by the called user or other), how easy and flexible the PCS can be configured, the amount of system resources spent by the PCS server to locate the called user and to route the call there, etc.

DESCRIPTION OF THE PRIOR ART

Conventional PCS-servers as basically shown in FIG. 1 have been implemented in different ways as shown in FIGS. 3a–3d. WO-9621329 describes the interaction of a cellular mobile communications network and a private network with at least one exchange or PBX in which access is provided between the cellular mobile communications network and a private network. A mobility server is connected to a PBX over an interface for calls to/from personal telephone number users. Thus, a cellular phone can gain an access to all services provided by the PBX or by the private network using the same destination location numbering plan irrespective of whether using a cellular or cordless telephone.

U.S. Pat. No. 4,313,035 describes that a calling party can reach a called subscriber wherever the subscriber may be located by merely keying from a standard push-button telephone set a personal telephone number unique to the called subscriber. The personal telephone is sent to a centralized data base and a telephone number at which the subscriber is located is returned to an exchange and the call is automatically completed to the telephone number where the called subscriber is located. This document describes a call forwarding system, that is a call forwarding to a unique extension is performed which of course can be erased and registered and so on.

U.S. Pat. No. 0,749,118 describes a method where each individual subscriber is assigned a personal telephone number that is associated with the individual subscriber and not with the geographic location thereof. A person wishing to contact the subscriber need only dial this personal telephone number and the desired call will be automatically connected at the appropriate local area exchange by a network interexchange provider to a device wherever the subscriber may be. It is also described that the subscriber may use this single telephone number as a calling card number for placing calls from any telephone such that they will be built to the subscribers own single account.

WO-9318606 describes a personal communication service in a communication network which has a communication line and a central office switching system, connecting the lines selectively to provide a switched communication between the lines. Thus, the personal communication service is adaptable to each user's individual lifestyle via both land links and radio links such that communications seem seamless across boundaries of land line and video line networks.

Whilst in FIG. 1 it is assumed that each personal telephone number PTN is only associated with one destination profile DP, the prior art also describes the association of several destination profiles to the same personal telephone number such that the most suitable one can be selected depending on certain conditions, e.g. the user location, the hour of day etc. The possibility to have different profiles associated to a single personal telephone number is suggested in WO-9406236. A profile is selected depending on the time of day and the day of the week. Thus, the user schedules his/her different destination profiles according to his/her supposed locations during the day. This procedure is suitable for users with a "fixed" time schedule. However, for users with a "non-fixed" time schedule, a more flexible procedure is necessary since otherwise the user must change the scheduling of the profiles almost daily. However, since the destination profiles themselves are set by the system administrator, the only possibility in order to select—for a single PTN number—one of several profiles is to change the time of day or time of the week when a specific destination profile is to be selected. In this connection also U.S. Pat. No. 0,887,758 describes the routing of an incoming call according to a destination profile which can be scheduled by the subscriber. An application server with voice and data input and outputs has a unit for accessing the profile to determine how to route an incoming call.

In addition to the activation of predetermined destination profiles in accordance with the user location and the hour of the day, some prior art documents have also concentrated on the criteria to go through the sequence of destinations taking into account certain circumstances which may happen when a destination in sequence is selected to deliver the call or once the call has been delivered to a selected destination. Such criteria have been used for the situation "before call delivery" and the situation "after the call is delivered".

For the case "before-call-delivery" U.S. Pat. No. 0,144,062 describes the routing of a telephone call if a selected destination is the same as the calling party. The selected destination is skipped over so that no attempt is made to complete the PTN call towards the calling telephone. The distribution then continues to the next destination location in the sequence of the stored destination profile.

U.S. Pat. No. 0,346,654 describes the routing of a telephone call if the selected destination is not available, e.g. if the telephone at the selected destination location is disconnected or if a wireless telephone at the selected destination location has been turned off. The selected destination location is skipped over so that no attempt is made to complete the PTN telephone call towards the unavailable destination. The call distribution then continues to the next destination in the sequence.

U.S. Pat. No. 0,363,496 describes a personal communications system, where a central processor queries the destination terminals when a unique personal telephone number of a subscriber is dialed. The call is then completed to the terminal location that was most recently visited by the subscriber.

EP-0 302 282 describes a personal communications system where the user can indicate his present location by calling the service and providing information by use of a smart card device. The service holds a user profile in a central data base. This data base has the list of possible contact points for each period in the data, e.g. each 15 minutes. Each possible contact point has an associated success probability. When a personal telephone number is called the relevant time of a day profile is retrieved and the numbers are called in a probability order. A success or failure of the call modifies the probabilities.

The personal communication system disclosed in U.S. Pat. No. 0,806,861 describes a call forwarding method using an adaptive model of the user behavior where the likelihood of a subscriber location is predicted. When a call to a personal telephone number of the subscriber is received, a model of the subscriber's behavior predicts the likelihood of the subscriber being at different locations. The call is forwarded to a telephone at the most likely location by considering the current day of the week and the time of the day. This provides an accurate call forwarding when using adaptive models, e.g. neural networks, of the behavior of individuals corresponding to assigned personal telephone numbers.

Furthermore, WO-9429992 describes a flexible call handling in a personal communications service by indicating the context of a call. The user is thus provided with additional services in handling and screening incoming calls.

The situation when the selected destination is busy has also been investigated for the case "after the call is delivered". When the PTN call is delivered towards a busy destination, the destination continues to a specific predetermined destination which is appointed to attend to calls to busy destination for that destination profile. The procedure is described in a course for intelligent network, reference LZTE 501289 R2A in the implementation of a personal number service Therefore, instead of going through all sequential predetermined destination locations in the destination profile, in case of selected destination being busy, a specific predetermined destination location is used.

SUMMARY OF THE INVENTION

As described above regarding the prior art, personal communication system implemented in different network configurations and using a number of destination profiles and a number of different selection criteria with several user profiles are known in the state of the art. In this respect, WO-9621329, U.S. Pat. No. 0,749,118 and WO-9318606 describe general personal communication systems using personal telephone numbers. WO-9406236 and U.S. Pat. No. 0,887,758 describe the day and time dependent destination profiles. Different distribution criteria are mentioned in other documents (EP-719059: last visited terminal; U.S. Pat. No. 0,144,062: do not send the call to the calling terminal; U.S. Pat. No. 0,346,654: do not send the call to a disconnected terminal; WO-9737499 & WO-9838781: using probability of subscriber to be at a location; and WO-9429992: by roles).

However, all these prior art documents are still disadvantageous in that they do not allow a flexible control or handling of the destination profiles by the PCS subscriber and do not allow a flexible distribution or delivery of an incoming call expect that a different profile is selected dependent on the time of day or week. Therefore, in particular the following disadvantages result from the prior art:
1. A first disadvantage is that a user with a "non-fixed" time schedule" is going to change his/her location, he/she can not activate/deactivate his/her personal communication service in a flexible user-orientated way, i.e. without having to contact the system administrator or to use a configuration tool. That is, once the system administrator has set the destination profile in advance, the only possibility the user has is to set a time schedule.
2. A second disadvantage similar to the first disadvantage occurs when a user with a "non-fixed" time schedule is going to change his/her location, he/she can not change the sequence of destination in a convenient way, i.e. without having to contact the system administrator or to use a configuration tool. That is, the user has no influence on the destination sequence in his/her destination profiles.

3. The third disadvantage is that the user has no possibility to qualify predetermined destinations in his/her destination profile as the most suitable to attend to an incoming call depending on the origin of the incoming call. For example, when first contacting the system administrator, the user might include his/her GSM mobile telephone as one of the destination locations in the destination profile, however the user may not want to receive on this GSM mobile telephone calls which have been originated within his/her own company, since the user intends to use the mobile telephone only for private calls originate outside the company.

4. A fourth disadvantage similar to the third disadvantage is that some destinations in the destination profile, although included in the beginning by the system administrator in the destination profiles, are not suitable to attend to specific types of calls. For example, a sequence of destinations may contain different types of the devices (voice mail, FAX, video etc.). Going through the complete sequence of destination locations and attempting to route the call to all such destination locations wastes unnecessary time if some of the destination locations do not have a compatible device to attend to the type of incoming call. This a waste of time and system resources. That is, the user can not configure the destination profile according to his own personal needs or according to his types of calls after the destination profile is set by the system administrator in the beginning.

5. A sequence of destination locations may contain several destinations which are attended by the same user since each personal telephone number is associated with a personal subscriber. If one of the destination locations is busy, attempting another destination is a waste of time and system resources, since the user can not be present simultaneously at two different locations. As already explained above with reference to the LZTE 501298 R2A reference, in case one of the destination locations of a destination profile is busy, a predetermined destination location of the destination profile can be specified. However, the user has no possibility to appoint different new destinations for each separate destination location in the sequence to forward the call, if the destination location is busy. That is, the user can not set different conditions for each of the destination location in case of busy (e.g. "if my company extension is busy, I want my secretary to attend the call; however, if may home telephone is busy, I want the call to be forwarded to a voice mail system"). Therefore, a fifth disadvantage is that the same destination location is used in all cases where one of the destination location of the destination profile is busy.

6. A sixth disadvantage of the prior art occurs when a clash between the call forwarding used in the PCS system and a call forwarding in another network occurs as shown in FIG. 4. That is, in the destination profile a destination location in the sequence may relate to a destination location outside the PCS network, i.e. in the "other network" as shown in FIG. 4. Therefore, interactions between the PCS delivery and any other redirecting service (e.g. call forwarding) can occur, if for example the telephone number at that destination location has also been programmed with a call forwarding to the PTN. That is, if for example the telephone in FIG. 4 issues a call in step S1 which is directed to the PTN number handled by the PCS network, it may happen that in step S2 the PCS call delivery takes place to the originating telephone. If the originating telephone has programmed a call forwarding again to the PTN number, then a call forwarding will again take place to the PTN number in step S3. Therefore, it is possible, that the call goes through several loops until an error in the system occurs. During the looping of the call a lot of system resources are spent unnecessarily since it can not be guaranteed that the call will ever be answered.

Therefore, the aim of the present invention is to eliminate the above-described disadvantages over the conventional personal communications system.

Thus, the object of the present invention is to provide a personal communication system server, a personal communication system and a method for controlling a personal communication system which allow the PCS users to flexibly configure one or more destination profiles allocated to their personal telephone numbers according to their own personal needs and thus allow a distribution of an incoming PTN in a very flexible manner.

Solutions of the Object

This object is solved by a personal communication system server (claim 1) of a personal communication system providing PCS subscribers with personal telephone numbers PTNs, comprising a PCS destination profile memory storing in association with at least one personal telephone number PTN a number of destination profiles respectively consisting of a sequence of destination numbers indicating a number of predetermined destination locations; a PCS routing means for completing an incoming call directed to said PTN by routing the incoming call sequentially to destination locations in accordance with the sequence indicated in a destination profile until said call is abandoned or answered, said PCS server further comprising a destination profile handling means for selectively handling one or more of said destination profiles stored in said PCS destination profile memory in response to a destination profile handling message received via said PCS communication system and including at least one handling parameter indicating a predetermined handling of at least one of said destination profiles.

The object is also solved by a personal communication system server (claim 19) of a personal communication system providing PCS subscribers with personal telephone numbers PTNs, comprising a PCS destination profile memory storing in association with at least one personal telephone number PTN a number of destination profiles respectively consisting of a sequence of destination numbers indicating a number of predetermined destination locations and a PCS routing means for completing an incoming call directed to said PTN by routing the incoming call sequentially to destination locations in accordance with the sequence indicated in a destination profile until said call is abandoned or answered, wherein one or more of said destination numbers have associated with them one or more call distribution parameters, and said PCS routing means routes an incoming PTN call to destination locations in said destination profile in accordance with the sequence indicated in a destination profile and said one or more call distribution parameters until said call is abandoned or answered.

The object is also solved by a method (claim 38) to control a personal communication system server of a personal communication system providing PCS subscribers with personal telephone numbers PTNs, comprising the following steps: storing in a PCS destination profile memory in association with at least one personal telephone number PTN a number of destination profiles respectively consisting of a sequence of destination numbers indicating a number of predetermined destination locations; and completing an incoming call directed to said PTN by routing the incoming call by a PCS routing means sequentially to destination locations in accordance with the sequence indicated in the destination profile until said call is abandoned or answered, sending a destination profile handling message to said PCS server via said PCS communication system including at least one handling parameter indicating a predetermined handling of at least one of said destination profiles; and selectively handling one or more of said destination profiles stored in said PCS destination profile memory in accordance with said handling parameter.

The object is also solved by a method (claim 56) to control a personal communication system server of a personal communication system providing PCS subscribers with personal telephone numbers PTNS, comprising storing in a PCS destination profile memory in association with at least one personal telephone number PTN a number of destination profiles respectively consisting of a sequence of destination numbers indicating a number of predetermined destination locations; and completing an incoming call directed to said PTN by routing the incoming call sequentially to destination locations in accordance with the sequence indicated in a destination profile until said call is abandoned or answered, wherein one or more of said destination numbers have associated with them one or more call distribution parameters, and an incoming PTN call is routed to destination locations in said destination profile in accordance with the sequence indicated in a destination profile and said one or more call distribution parameters until said call is abandoned or answered.

According to the invention, the PCS server comprises a destination profile control means for selectively handling one or more of the destination profiles stored in the PCS destination profile memory in response to a destination profile handling message received via the PCS communication system and including at least one handling parameter indicating a predetermined handling or controlling of at least one of the destination profiles. That is, whilst conventionally it was only possible to change the actual destination profile by the system administrator during setup, according to the invention a flexible influencing, i.e. controlling, handling and processing, of the destination profiles is possible through the controlling or handling parameters in the control message. Thus, a user can flexibly configure his own destination profiles according to his own needs.

Therefore a call delivery can take place in accordance with the specially set call distribution criteria which can be either set by the user or by the system. This increases the flexibility of the PCS server significantly and a PTN call can be routed in a flexible way by considering the user-set or system-set call distribution parameters.

Preferred Aspects of the Invention

One aspect of the invention relates to a personal communication system PCS server PCS-SERV of a personal communication system providing PCS subscribers with personal telephone numbers PTNs, comprising:

a) a PCS destination profile memory DP-MEM storing in association with at least one personal telephone number PTN a number M of destination profiles DPm respectively consisting of a sequence of destination numbers PDNn indicating a number N of predetermined destination locations; and b) a PCS routing means PCS-RM for completing an incoming call directed to said PTN by routing the incoming call sequentially to destination locations in accordance with the sequence indicated in a destination profile until said call is abandoned or answered;

c) said PCS server PCS-SERV further comprising a destination profile handling means DP-HM comprising an activation/deactivation means ACT/DACT for selecting and activating/deactivating a predetermined one of said destination location profiles DPm in said PCS destination profile memory DP-MEM in response to a selection/activation/deactivation handling parameter SEL/ACT/DACT in a destination profile handling message DP-HMESS received via said PCS communication system and indicating said predetermined destination location profile DPm to be selected/activated/deactivated.

Preferably, said selection/activation/deactivation parameter SEL/ACT/DACT comprises a combination of digits 0–9 and/or symbols *, # which indicate a selection/activation/deactivation request and a number of the destination profile to be selected.

Preferably, said destination profile handling message DP-HMESS includes a user authority code or a PIN Personal Identity Number wherein said PCS server PCS-SERV further includes an authorisation check means ID-CHECK for checking the user authorisation of said received destination profile handling message DP-HMESS.

Another aspect of the invention relates to a personal communication system PCS server PCS-SERV of a personal communication system providing PCS subscribers with personal telephone numbers PTNs, comprising:

a) a PCS destination profile memory DP-MEM storing in association with at least one personal telephone number PTN a number M of destination profiles DPm respectively consisting of a sequence of destination numbers PDNn indicating a number N of predetermined destination locations; and b) a PCS routing means PCS-RM for completing an incoming call directed to said PTN by routing the incoming call sequentially to destination locations in accordance with the sequence indicated in a destination profile until said call is abandoned or answered;

c) said PCS server PCS-SERV further comprising a destination profile handling means DP-HM including a destination profile switching means DP-SWP for switching between predetermined ones of said destination profiles DPm in said PCS destination profile memory DPM in response to a destination profile switching parameter SWP of a destination profile handling message DP-HMESS received via said PCS communication system and indicating a predetermined destination location profile DPm to be switched to.

Preferably, said switching parameter SWP comprises a combination of digits 0–9 and/or symbols *, # which indicate the switching request and a number of the destination profile to be switched to.

Preferably, said destination profile handling message DP-HMESS includes a user authority code or a PIN Personal Identity Number wherein said PCS server PCS-SERV further includes an authorisation check means ID-CHECK for checking the user authorisation of said received destination profile handling message DP-HMESS.

Preferably, said destination profile handling message DP-HMESS is issued by a handling request means H-RM of the PCS subscriber telephone PCS-TEL located within the PCS communication system.

Preferably, said destination profile handling message DP-HMESS is issued by a handling request means H-RM of the PCS subscriber telephone PCS-TEL outside the PCS communication system.

Preferably, said PCS server has associated with it a predetermined PCS server number PCS-SERV-NO to which said destination profile handling message DP-HMESS is routed by the system.

Preferably, said PCS server PCS-SERV further comprises a voice message storage means VOICE for storing predetermined voice messages V-MESS provided to a PCS subscriber PCS-SUB by said PCS routing means RM after said destination profile handling message DP-HMESS is received by said PCS server.

Another aspect of the invention relates to a personal communication system providing PCS subscribers with personal telephone numbers PTNs, comprising:
a) a PCS destination profile memory DP-MEM storing in association with at least one personal telephone number PTN a number M of destination profiles DPm respectively consisting of a sequence of destination numbers PDNn indicating a number N of predetermined destination locations; and
b) a PCS routing means PCS-RM for completing an incoming call directed to said PTN by routing the incoming call sequentially to destination locations in accordance with the sequence indicated in a destination profile until said call is abandoned or answered;
c) said PCS server PCS-SERV further comprising a destination profile handling means DP-HM including a destination subset determining means FDSS-DET for setting at least one call origin parameter ORGP at one or more of said destination locations in at least one destination profile to determine at least one subset of destinations in at least one destination profile which shall attend to PTN calls having a call origin as indicated by said PTN call origin parameter ORGP, in response to at least one PTN call origin parameter ORGP of a destination profile handling message DP-HMESS received via said PCS communication system and indicating for one or more predetermined destination locations the allowed call origin for a PTN call.

Another aspect of the invention relates to a personal communication system providing PCS subscribers with personal telephone numbers PTNs, comprising:
a) a PCS destination profile memory DP-MEM storing in association with at least one personal telephone number PTN a number M of destination profiles DPm respectively consisting of a sequence of destination numbers PDNn indicating a number N of predetermined destination locations; and
b) a PCS routing means PCS-RM for completing an incoming call directed to said PTN by routing the incoming call sequentially to destination locations in accordance with the sequence indicated in a destination profile until said call is abandoned or answered;
c) said PCS server PCS-SERV further comprising a destination profile handling means DP-HM including a destination subset determining means SDSS-DET for setting said at least one teleservice-type parameter TELEP at one or more of said destination locations in at least one destination profile to determine at least one subset of destinations in at least one destination profile which shall attend to PTN calls having a teleservice-type as indicated by said PTN call teleservice type parameter TELEP, in response to at least one teleservice-type parameter TELEP of a destination profile handling message DP-HMESS received via said PCS communication system and indicating the allowed teleservice type of a PTN call.

Another aspect of the invention relates to a personal communication system providing PCS subscribers with personal telephone numbers PTNs, comprising:
a) a PCS destination profile memory DP-MEM storing in association with at least one personal telephone number PTN a number M of destination profiles DPm respectively consisting of a sequence of destination numbers PDNn indicating a number N of predetermined destination locations; and
b) a PCS routing means PCS-RM for completing an incoming call directed to said PTN by routing the incoming call sequentially to destination locations in accordance with the sequence indicated in a destination profile until said call is abandoned or answered;
c) said PCS server PCS-SERV further comprising
a busy state determining means BST-DM for determining whether a destination location of said destination profiles is busy or not;
a busy option set means BO-SM for setting busy options in said destination locations in said destination profiles in response to busy option parameters BOP of a destination profile handling message DP-HMESS received via said PCS system and indicating busy options for said destination locations of said destination profiles DP, said busy options indicating for a particular destination location either a destination location in said destination profile to which a PTN call is to be routed by said PCS routing means PCS-RM in case the busy state determination means BST-DM determines a particular destination location as busy, or the issuance of a busy indication to the calling subscriber; and
d) said PCS routing means PCS-RM routing said received PTN call from destination location to destination location in accordance with said busy options parameters set in the destination profiles.

Another aspect of the invention relates to a personal communication system providing PCS subscribers with personal telephone numbers PTNs, comprising:
a) a PCS destination profile memory DP-MEM storing in association with at least one personal telephone number PTN a number M of destination profiles DPm respectively consisting of a sequence of destination numbers PDNn indicating a number N of predetermined destination locations; and
b) a PCS routing means PCS-RM for completing an incoming call directed to said PTN by routing the incoming call sequentially to destination locations in accordance with the sequence indicated in a destination profile until said call is abandoned or answered;
c) said PCS server PCS-SERV further comprising:
a PTN number of calls flag setting means NOCF-SM for setting a PTN number of calls flag NOCF at said destination location in said destination profiles;
a PTN number of calls determining means NOC-DM for determining whether a call is already being delivered to a destination location to which said incoming PTN call is to be delivered, said PTN number of calls flag setting means NOCF-SM setting said PTN number of calls flag NOCF when it is determined that a call is being delivered to said destination location and resetting said flag if no call is being delivered; and
wherein said PCS routing means PCS-RM routes an incoming PTN call to said destination location if said PTN number of calls flag NOCF is determined not to be set and to the next destination location in the destination profile if said PTN number of calls flag NOCF is determined to be set.

Another aspect of the invention relates to a personal communication system providing PCS subscribers with personal telephone numbers PTNs, comprising:
a) a PCS destination profile memory DP-MEM storing in association with at least one personal telephone number PTN a number M of destination profiles DPm respectively consisting of a sequence of destination numbers PDNn indicating a number N of predetermined destination locations; and
b) a PCS routing means PCS-RM for completing an incoming call directed to said PTN by routing the incoming call sequentially to destination locations in accordance with the sequence indicated in a destination profile until said call is abandoned or answered;
c) said PCS server PCS-SERV further comprising:
a PTN number of calls flag setting means NOCF-SM for setting a PTN number of calls flag NOCF at one or more destination location in said destination profiles;
a PTN number of calls parameter setting means NOCP-SM for setting a PTN number of calls parameter at one or more destination location in said destination profiles;
a PTN number of calls determining means NOC-DM for determining whether a call is already being delivered to a destination location to which said incoming PTN call is to be delivered, said PTN number of calls flag setting means NOCF-SM setting said PTN number of calls flag NOCF when it is determined that a call is being delivered to said destination location and resetting said flag if no call is being delivered;
wherein said PCS routing means PCS-RM routes an incoming PTN call to said destination location if said PTN number of calls flag NOCF is determined not to be set or if it is set and said PTN number of calls parameter NOCP indicates that more than one call can be provided to said destination location, and to the next destination location in the destination profile if said PTN number of calls flag NOCF is determined to be set and said PTN number of calls parameter NOCP indicates that only one call can be provided to said destination location.

Another aspect of the invention relates to a PCS server including in combination the means listed in each of the aforementioned aspects.

Another aspect of the invention relates to a PCS communication system, comprising one or more of said aforementioned PCS-servers in a network configuration.

Another aspect of the invention relates to a method to control a personal communication system PCS server PCS-SERV of a personal communication system providing PCS subscribers with personal telephone numbers PTNs, comprising the following steps:
a) storing in a PCS destination profile memory DP-MEM in association with at least one personal telephone number PTN a number M of destination profiles DPm respectively consisting of a sequence of destination numbers PDNn indicating a number N of predetermined destination locations; and
b) completing an incoming call directed to said PTN by routing the incoming call by a PCS routing means PCS-RM sequentially to destination locations in accordance with the sequence indicated in the destination profile until said call is abandoned or answered;
c) sending a destination profile handling message DP-HMESS to said PCS server PCS-SERV via said PCS communication system including at least a selection/activation/deactivation handling parameter SEL/ACT/DACT indicating a predetermined destination location profile DPm to be selected/activated/deactivated.
d) selecting and activating/deactivating said predetermined one of said destination location profiles DPm stored in said PCS destination profile memory DP-MEM in accordance with said selection/activation/deactivation handling parameter SEL/ACT/DACT.

Preferably, said selection/activation/deactivation parameter SEL/ACT/DACT a combination of digits 0–9 and/or symbols *, # which indicate a selection/activation/deactivation request and a number of the destination profile to be selected is sent in said destination profile handling message DP-HMESS.

Preferably, the method can comprise a sending as a destination profile handling parameter DP-HM in said destination profile handling message DP-HMESS a user authority code or a PIN Personal Identity Number and checking the user authorisation of said received destination profile handling message DP-HMESS in said PCS server PCS-SERV.

Another aspect of the invention relates to a method to control a personal communication system providing PCS subscribers with personal telephone numbers PTNs, comprising the following steps:
a) storing in a PCS destination profile memory DP-MEM in association with at least one personal telephone number PTN a number M of destination profiles DPm respectively consisting of a sequence of destination numbers PDNn indicating a number N of predetermined destination locations; and
b) completing an incoming call directed to said PTN by routing the incoming call by a PCS routing means PCS-RM sequentially to destination locations in accordance with the sequence indicated in the destination profile until said call is abandoned or answered;
c) sending a destination profile handling message DP-HMESS via said PCS communication system to said PCS server PCS-SERV including a destination profile switching parameter SWP indicating a predetermined destination location profile DPm to be switched to; and
d) switching between predetermined ones of said destination profiles DPm in said PCS destination profile memory DPM in response to said destination profile switching parameter SWP.

Preferably, said switching parameter SWP comprises a combination of digits 0–9 and/or symbols *, # which indicate the switching request and a number of the destination profile to be switched to.

Preferably, the method can comprise a sending as a destination profile handling parameter DP-HM in said destination profile handling message DP-HMESS of a user authority code or a PIN Personal Identity Number and checking the user authorisation of said received destination profile handling message DP-HMESS in said PCS server PCS-SERV.

Preferably, said destination profile handling message DP-HMESS is issued by a handling request means H-RM of the PCS subscriber telephone PCS-TEL located within the PCS communication system.

Preferably, said destination profile handling message DP-HMESS is issued by a handling request means H-RM of the PCS subscriber telephone PCS-TEL outside the PCS communication system.

Preferably, said destination profile handling message DP-HMESS is routed to predetermined PCS server number PCS-SERV-NO associated with said PCS server PCS-SERV.

Preferably, the method can comprise a storing in a voice message storage means VOICE predetermined voice messages V-MESS and providing one of them to a PCS subscriber PCS-SUB after said destination profile handling message DP-HMESS is received by said PCS server PCS-SERV.

Another aspect of the invention relates to a method to control a personal communication system PCS server PCS-SERV of a personal communication system providing PCS subscribers with personal telephone numbers PTNs, comprising the following steps:

a) storing in a PCS destination profile memory DP-MEM in association with at least one personal telephone number PTN a number M of destination profiles DPm respectively consisting of a sequence of destination numbers PDNn indicating a number N of predetermined destination locations; and b) completing an incoming call directed to said PTN by routing the incoming call by a PCS routing means PCS-RM sequentially to destination locations in accordance with the sequence indicated in the destination profile until said call is abandoned or answered;

c) sending a destination profile handling message DP-HMESS via said PCS communication system to said PCS-server including at least one PTN call origin parameter ORGP indicating the allowed call origin for an issued PTN call for one or more of said destination locations in said destination profile;

d) setting at least one call origin parameter ORGP at one or more of said destination locations in at least one destination profile to determine at least one subset of destinations in at least one destination profile which shall attend to PTN calls having a call origin as indicated by said PTN call origin parameter ORGP.

Another aspect of the invention relates to a method to control a personal communication system providing PCS subscribers with personal telephone numbers PTNs, comprising the following steps:

a) storing in a PCS destination profile memory DP-MEM in association with at least one personal telephone number PTN a number M of destination profiles DPm respectively consisting of a sequence of destination numbers PDNn indicating a number N of predetermined destination locations; and b) completing an incoming call directed to said PTN by routing the incoming call by a PCS routing means PCS-RM sequentially to destination locations in accordance with the sequence indicated in the destination profile until said call is abandoned or answered;

c) sending a destination profile handling message DP-HMESS via said PCS communication system to said PCS server PCS-SERV including at least one PTN call teleservice-type parameter TELEP indicating the allowed teleservice type for an issued PTN call at one or more of said destination locations; and d) setting said at least one teleservice-type parameter TELEP at one or more of said destination locations in at least one destination profile to determine at least one subset of destinations in at least one destination profile which shall attend to PTN calls having a teleservice-type as indicated by said PTN call teleservice type parameter TELEP, in response to said at least one teleservice-type parameter TELEP of said destination profile handling message DP-HMESS.

Another aspect of the invention relates to a method to control a personal communication system providing PCS subscribers with personal telephone numbers PTNS, comprising the following steps:

a1) storing in a PCS destination profile memory DP-MEM in association with at least one personal telephone number PTN a number M of destination profiles DPm respectively consisting of a sequence of destination numbers PDNn indicating a number N of predetermined destination locations; and a2) wherein busy options are set in said destination locations in said destination profiles, said busy options indicating for a particular destination location either another destination location in said destination profile to which said PTN call is to be routed or the issuance of a busy indication to the calling subscriber in case a particular destination location is determined as busy;

b) routing an incoming PTN call directed to said PTN to a first destination location in accordance with an active destination profile;

c1) determining whether said first destination location of said destination profile is busy or not;

c2) determining the busy option parameter BOP at said first destination location in said destination profile;

d1) routing said received PTN call from said first destination location to a second destination location in said destination profile if said first destination location is busy and if said busy option indicates that the PTN call is to be transferred to said second destination location in case of said first destination location being busy; and d2) returning a busy indication to said calling party of said PTN call if said first destination location is busy and if said busy option indicates that the a busy indication is to be returned in case of said first destination location being busy.

Another aspect of the invention relates to a method to control a personal communication system PCS server PCS-SERV of a personal communication system providing PCS subscribers with personal telephone numbers PTNs, comprising the following steps:

a) storing in a PCS destination profile memory DP-MEM in association with at least one personal telephone number PTN a number M of destination profiles DPm respectively consisting of a sequence of destination numbers PDNn indicating a number N of predetermined destination locations;

b) determining whether a PTN call is being delivered to the destination location to which said incoming PTN call is to be routed in accordance with an destination profile and setting a PTN number of calls flag NOCF at said destination location in said destination profile if it is determined that a call is being delivered to said destination location;

c) determining whether the PTN number of calls flag NOCF is set or not at a first destination location in said destination profile to which said PTN call is to be routed;

d1) routing said received PTN call to said destination location if said PTN number of calls flag NOCF is determined not to be set; and d2) routing said received PTN call to the next destination location in the destination profile if said PTN number of calls flag NOCF is determined to be set.

Preferably, the method can comprise a resetting said flag if said PTN call is answered by said destination location or abandoned.

Another aspect of the invention relates to a method to control a personal communication system PCS server PCS- SERV of a personal communication system providing PCS subscribers with personal telephone numbers PTNs, comprising the following steps:

a) storing in a PCS destination profile memory DP-MEM in association with at least one personal telephone number PTN a number M of destination profiles DPm respectively consisting of a sequence of destination numbers PDNn indicating a number N of predetermined destination locations;

b1) determining whether a PTN call is being delivered to the destination location to which said incoming PTN call is to be routed in accordance with an destination profile and setting a PTN number of calls flag NOCF at said destination location in said destination profile if it is determined that a call is being delivered to said destination location;

b2) setting a PTN number of calls parameter NOCP at one more destination locations in said one or more destination profiles, said parameter indicating whether one call or more than one call can be delivered to a particular destination location;

c1) determining whether the PTN number of calls flag NOCF is set or not at a first destination location in said destination profile to which said PTN call is to be routed;

c2) deciding whether the PTN number of calls parameter NOCP indicates that one or more than call can be delivered to said destination location;

d1) routing said received PTN call to said destination location if said PTN number of calls flag NOCF is determined not to be set or if it is determined to be set and the PTN number of calls parameter indicates that more than one call can be delivered to said destination location; and d2) routing said received PTN call to the next destination location in the destination profile if said PTN number of calls flag NOCF is determined to be set and the PTN number of calls parameter indicates that only one call can be delivered to said destination location;

Another aspect of the invention relates to a method including in combination the steps listed in each of the aforementioned separate methods.

Furthermore, the invention is not limited to the above-described combinations of features. That is, the invention can comprise other embodiments resulting from a combination of features which have been separately described in the claims an/or in the description. Hereinafter, embodiments of the invention will be described with reference to the attached drawings.

BRIEF DESCRIPTION OF THE DRAWINGS

FIG. 5a shows a PCS-server according to the invention, in particular including a destination profile handling means DP-HM;

FIG. 7 shows a method according to a second embodiment of the invention;

FIGS. 7a, 7b show respectively methods according to a third embodiment of the invention;

FIG. 8 shows a destination profile DP' which has been supplemented by a number of additional call distribution criteria ORGP, TELEP, BOP, NOCP, NOCS;

FIGS. 9a, 9b respectively show methods according to the fourth embodiment of the invention;

FIGS. 10a, 10b respectively show methods according a fifth embodiment of the invention;

FIG. 10c shows a destination profile DP' similar as in FIG. 8 only having supplemented the busy option as an additional call distribution criteria;

FIGS. 11a, 11b show methods according to the sixth embodiment of the invention; and FIGS. 12a, 12b show a call delivery method according to the seventh embodiment of the invention.

PRINCIPLES OF THE INVENTION

As explained with reference to FIG. 3a–3d the personal communication service and the PCS server according to the invention can be implemented in different environments and is therefore not tied to a specific environment, configuration or call distribution method. The PCS server can be provided in different other environments like the private PBX or PBX network, in a PSTN or PLMN or an intelligent network (IN) service. The PCS server can be placed in different locations. For example in a telephone system the PCS server software can be placed in the exchange itself or it can be placed in an external device (e.g. a PC) connected to the exchange. In a network topology the PCS server can be provided by a specific node (exchange) in the network or it can be provided by every node (exchange) in the network.

Furthermore, the PCS routing means can use different methods to deliver the call to the different destinations in the destination profile. All such methods are included in the block 'router for call delivery ROUT' in the PCS routing means DP-RM in FIG. 5a. That is, the server could use a conventional call forwarding service (if available) of the telephone system. Alternatively, a basic call can be placed to the selected destination and then the incoming call is transferred on this basic call. As explained below, the personal communication service and the PCS server according to the invention use certain criteria which can be used to distribute the calls and to handle certain situations that can be found during the call distribution.

The contents of the destination profile (i.e. the destination locations where the call will be routed to and different criteria affecting each one of them) are set beforehand by the system administrator. That is, according to the invention, the profile contents can only be changed by the system administrator following the instructions from the user. However, according to the invention, the PCS user may configure, process or handle each destination profile and its entries individually.

Figure 1:
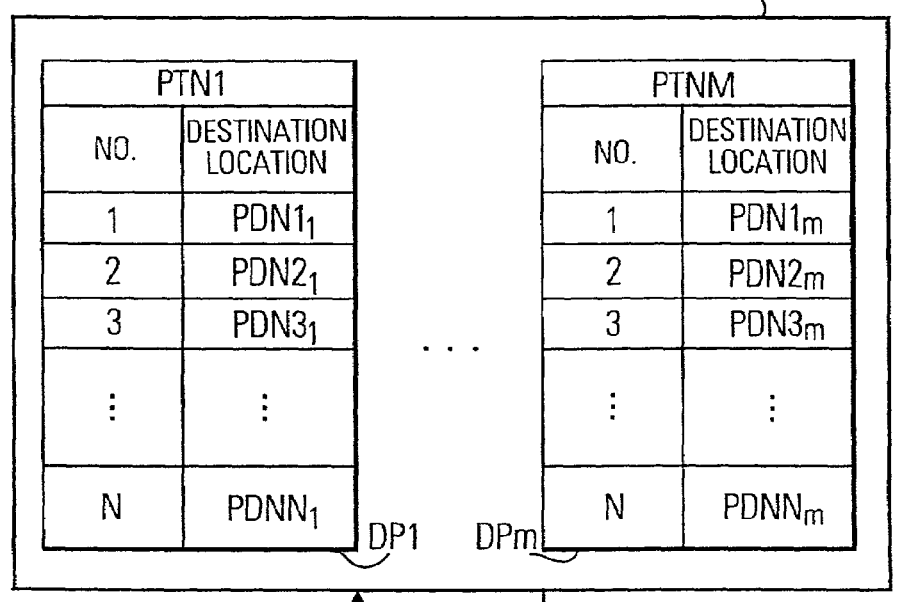
FIG. 1 shows a construction of PCS server PCS-SERV comprising a destination profile memory DP-MEM and PCS routing means PCS-RM according to the prior art.
Figure 2:
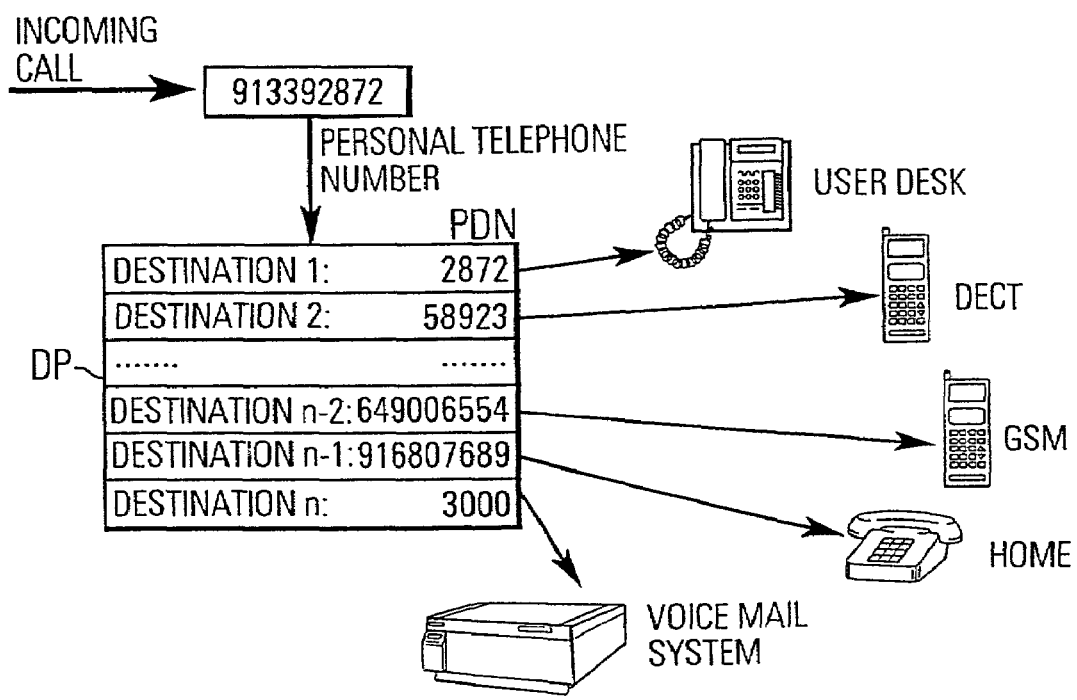
FIG. 2 shows an example of routing a call to different destinations in accordance with a destination profile according to the prior art.
Figure 3A:
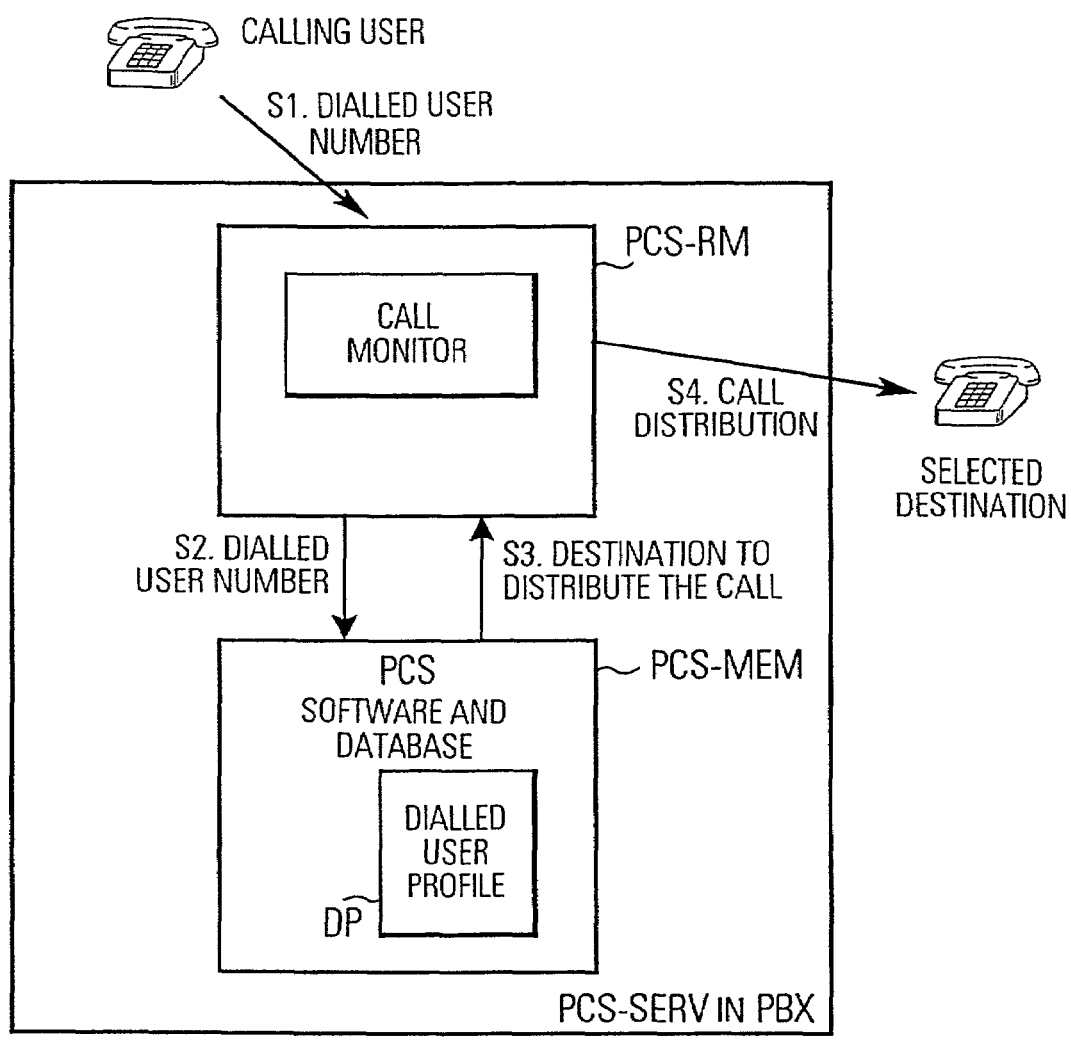
FIGS. 3a–3d show a different implementation examples of a personal communication system according to the prior art.
Figure 3B:
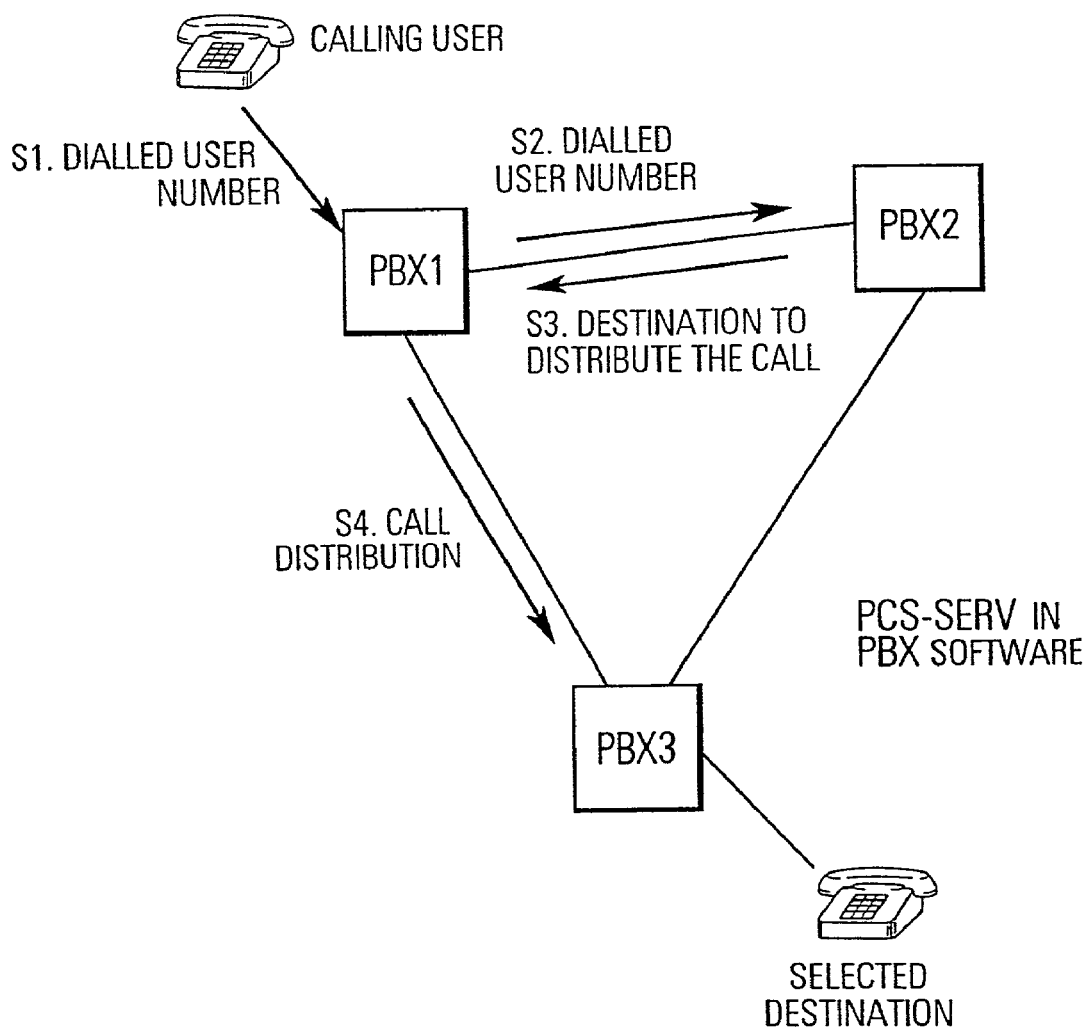
Figure 3C:
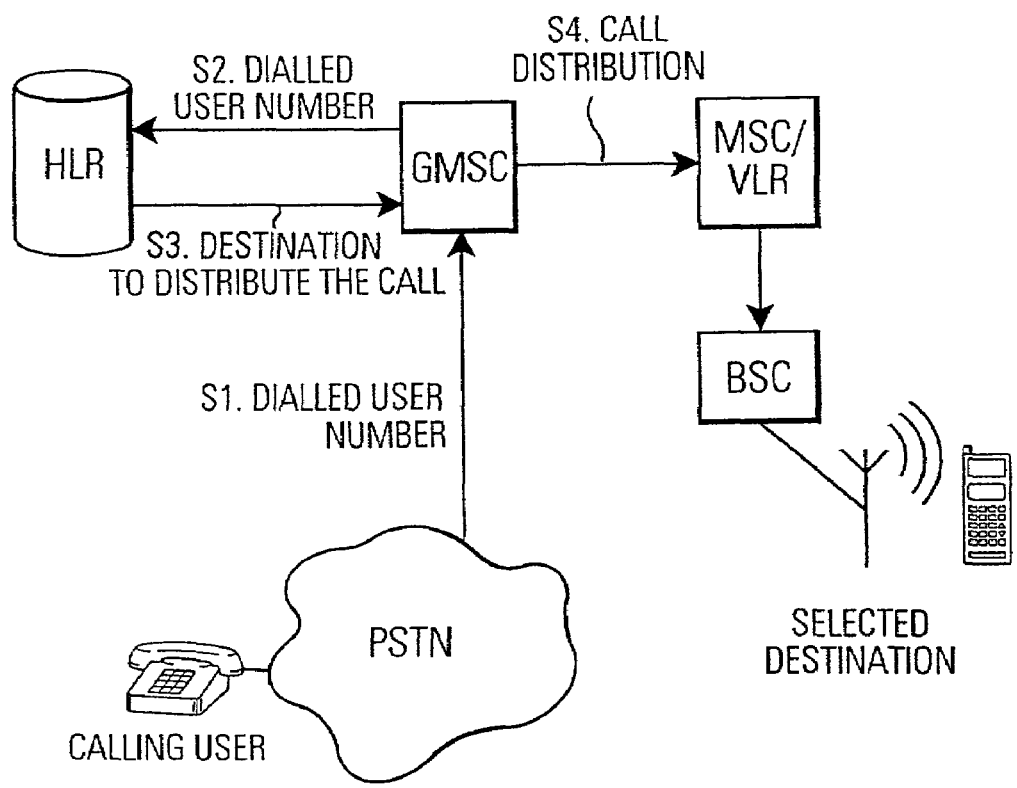
Figure 3D:
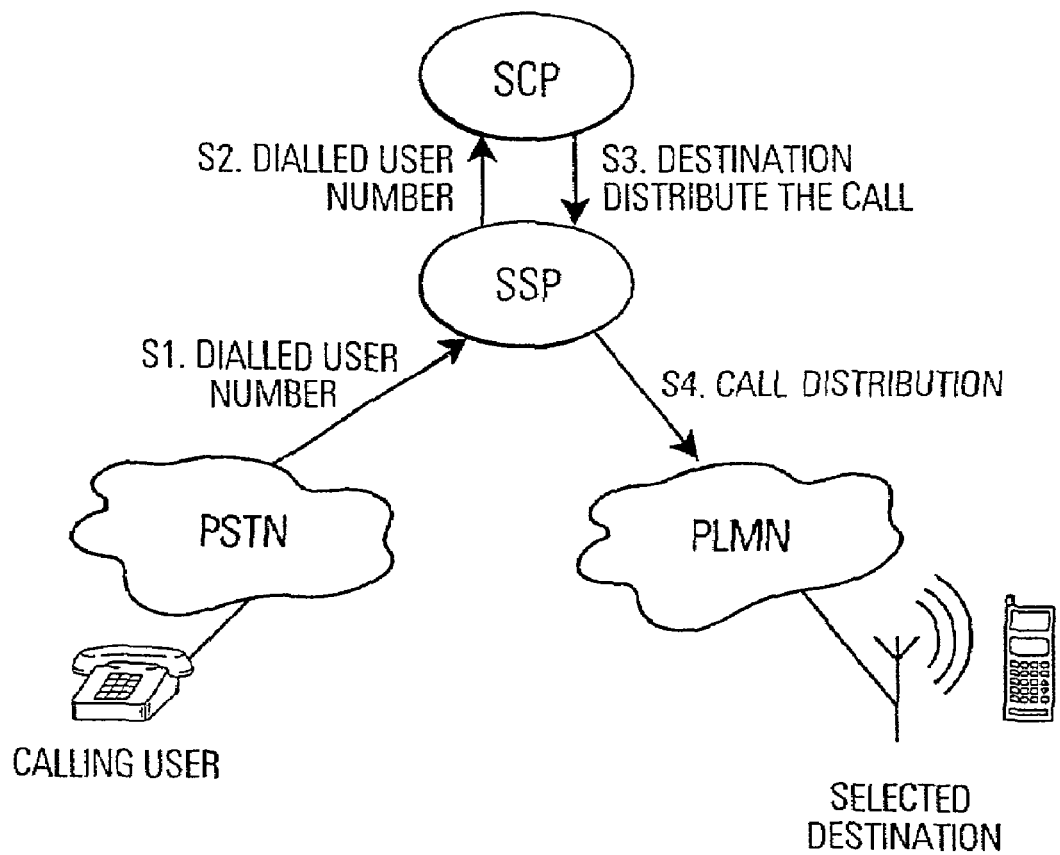
Figure 5B:
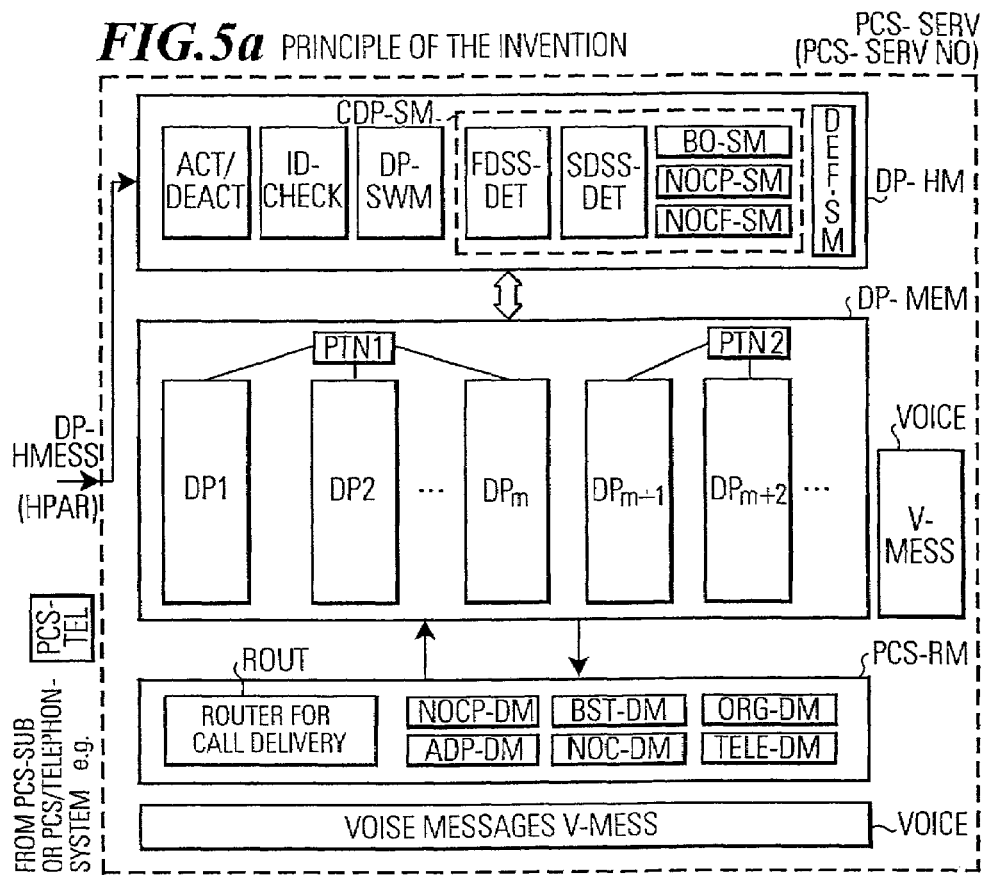
FIG. 5b shows a method for handling predetermined destination profiles in accordance with a destination profile handling message DP-HMESS.
Figure 5B:
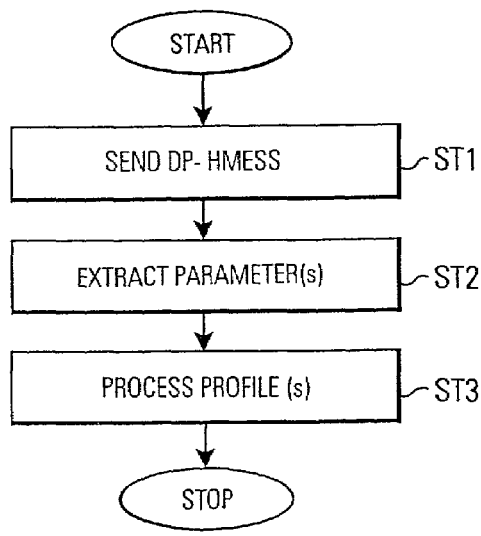
Figure 5C:
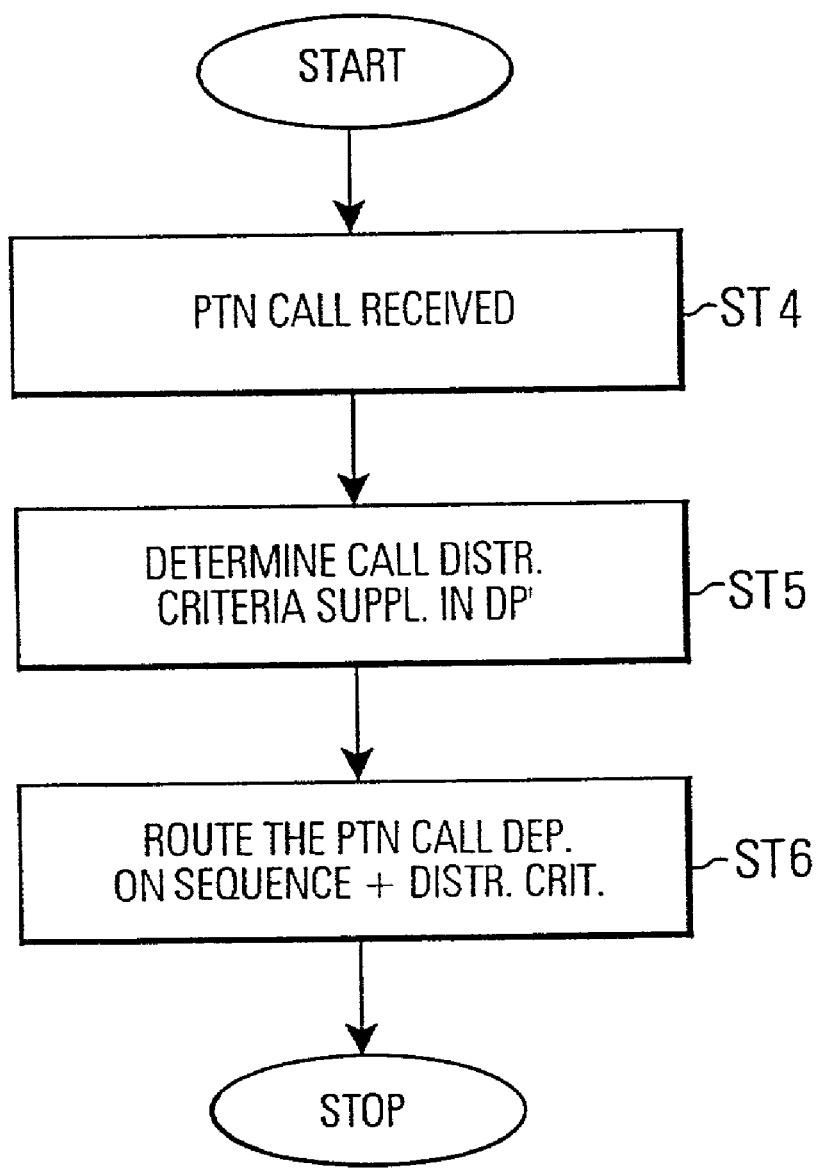
FIG. 5c shows a method for routing a call to a called party using call distribution parameters according to the invention.

FIG. 5a–5c respectively show the PCS server and methods according to the invention. In addition to the destination profile memory DP-MEM and the PCS routing means PCS-RM as in FIG. 1, the PCS server according to the invention also includes a PCS destination profile handling means DP-HM. This handling means also comprises a call distribution parameter setting means CDP-SM with which call distribution parameters can be set in the destination locations.

As shown in FIG. 5a, it is assumed that each personal telephone number PTN1, PTN2 has associated with it a number of destination profiles DP1, DP2 . . . DPm; DPm+1, DPm+2 etc. The destination profile handling means DP-HM selectively handles one or more of the destination profiles DPm stored in the PCS destination profile memory DP-MEM in response to a destination profile handling message DP-HMESS received via said PCS communication system and including at least one handling parameter HPAR indicating a predetermined handling of at least one said destination profiles DPm. The handling message DP-HMESS is sent to the PCS destination profile handling means DP-HM from a PCS user (or even from the system itself) desiring to control or configure his/her destination profiles stored in the DP-MEM memory. The basic function for the call delivery of the PCS routing means in FIG. 5a is the same as already explained with reference to FIG. 1.

As in particular shown in FIG. 5c, another important aspect of the invention is also that an incoming PTN call can not only be routed in accordance with the sequence as indicated in a destination profile but also in accordance with specifically set call distribution parameters which are associated with one or more of the destination locations in the destination profile. The additional call distribution parameters can be set be the user and/or the PCS system or the interconnected telephone system. In this connection it may be noted that the call distribution parameter usage for the call delivery is in principle independent from who is sending the handling message with the additional parameters because some or all of the additional call distribution parameters used may be supplied by the PCS system or the telephone system itself. However, of course the user can sent such parameters together with handling parameters relating to the activation and selection of a profile.

As shown in FIG. 5b, a (registered) PCS user (and/or the PCS system and/or the interconnected telephone system) sends a message DP-HMESS to the handling means DP-HM in step ST1. The PCS server may have associated to it a predetermined server number PCS-SERV-NO to which said destination profile handling message DP-HMESS is routed. If several PCS servers are provided in the PCS system, then each of them will have allocated a predetermined PCS server number. By including the PCS server number in the message DP-HMESS a specific server can be selected. The PCS user can include an personal ID (PIN) and the addressed server can return to the user an indication as to whether or not his/her destination profiles are stored at the addressed server or not. If not, the user must select and activate—via a new handling message—another PCS server. Such an indication can be provided in each of the embodiments below. The message can be provided by a request means of a user telephone. Thus, a PCS user located outside or inside the PCS network providing the personal communication system PCS can call this PCS-server number.

In addition the PCS server may comprise a voice message storing means VOICE for storing predetermined voice messages V-MESS. One or more of the voice messages V-MESS can be provided to the calling PCS subscriber after said destination profile handling message DP-HMESS is received by said PCS server.

In step ST2 the PCS destination profile handling means DP-HM may extract the handling parameter or the handling parameters from the message DP-HMESS. Alternatively, the handling parameter can be provided to the PCS destination profile handling means by first providing an indication (e.g. a tone or a recorded voice message from the voice message storage means VOICE) to the user whereafter the user can dial the handling procedure (as DTMF tones) in order to indicate the specific handling of one or more of the destination profiles. Therefore, the handling parameter HPAR can be provided directly in the handling message DP-HMESS or a first request message is sent as a part of the handling message and thereafter the handling parameter is transferred to the handling means DP-HM by a second part of the handling message. When the handling parameter HPAR has been received, then the profile or the profiles are appropriately configured, processed or handled in step ST3.

The processing, configuring or controlling of the destination profiles by means of the handling parameter HPAR may take different forms, as will be explained below with reference to specific embodiments of the invention. However, one core aspect of the invention with respect to the handling or processing of specific destination profiles is that the user can actively send a message for configuring (i.e. selecting, activating/deactivating/switching and setting of call distribution parameters) one or more of his/her destination profiles associated with his/her PTN number. In the prior art the user could only change the time schedule, i.e. the timing when a specific destination profile belonging to the same personal number PTN should be activated. However, the configuration of the destination profiles would only be done once by the system administrator during the set up of the service.

According to the invention, by using a specific message DP-HMESS including specific control or handling parameters the user can configure the destination profile (s) according to his/her own needs, i.e. dependent on specific call distribution criteria. The handling parameter HPAR indicates the one or more destination profiles, e.g. a number of the destination profile, which should be handled. In this context, "configuration" or "handling" or "controlling" comprises as a first aspect whether or not one or more of the destination profiles are actually used (i.e. whether they are selected and activated/deactivated) and as a second aspect the way how a destination profile is used (e.g. selecting only specific location destinations which have been pre-set by the administrator during the set up as usable for particular types of PTN calls, as will be explained below with more detail). The common aspect of the first and second aspect is that the handling takes place in response to a message sent to the PCS server to handle his/her own destination profiles.

In the first aspect the handling parameters HPAR will contain an indication with respect to which destination profile is to be used. In the second aspect the handling parameter will contain an indication as to how the destination profile is used. Thus, in response to the destination profile handling message DP-HMESS the PCS server will carry out a predetermined handling of at least one of the destination profiles as indicated by the destination profile handling message.

Thus, an improved flexibility of the usage of the different destination profiles is achieved because the destination profiles—once they are set by the system administrators—can be configured and supplemented with call distribution parameters by the PCS user according to his/her own needs and thus the user is not fixed to the predetermined setting of the system administrator.

It is noted that all parameters described below can be sent by a single handling message or via separate handling messages.

That is, according to the present invention a destination profile handling or control message DP-HMESS can be sent to the PCS-server PCS-SERV and the predetermined processing or handling of one or more destination profiles is carried out. This processing or controlling relates to the selection and activation/deactivation, switching or setting of other call distribution criteria in the destination profile of (see for example FIG. 8 to be explained below).

If a number of additional call distribution criteria have been set to the destination profiles as part of the processing of profiles in step ST3 in FIG. 5b (as initiated by the user or by system, i.e. both of them can issue the handling message with specific parameters) then a call delivery can take place as shown in FIG. 5c.

In step ST4 the PTN call is received and in step ST5 the call distribution criteria (parameters) supplemented in a destination profile DP' are determined. DP' can be the selected and activated destination profile in which additional call distribution criteria have been set due to a previously received handling message DP-HMESS. DP' can also be a default destination profile set by a default setting means DEF-SM of the handling means HM.

In step ST6 the PCS routing means PCS-RM routes the PTN call according to the selected and activated destination profile and by considering the destination profile sequence and the additional call distribution criteria set in the destination profile, for example as a result of the steps ST1–ST3 in FIG. 5b having been carried out by the PCS user or by the system.

Therefore, according to the present invention the routing criteria have been expanded and a call delivery will take place not merely on the basis of the sequential destination locations listed in the destination profile but also on the basis of additional criteria which the PCS subscriber or the system can set via the handling message DP-HMESS.

Hereinafter, embodiments of the invention will be described how a different handling of the destination profiles is carried out in response to the DP-HMESS message.

First Embodiment (Selection and Activation/Deactivation)

Figure 6:
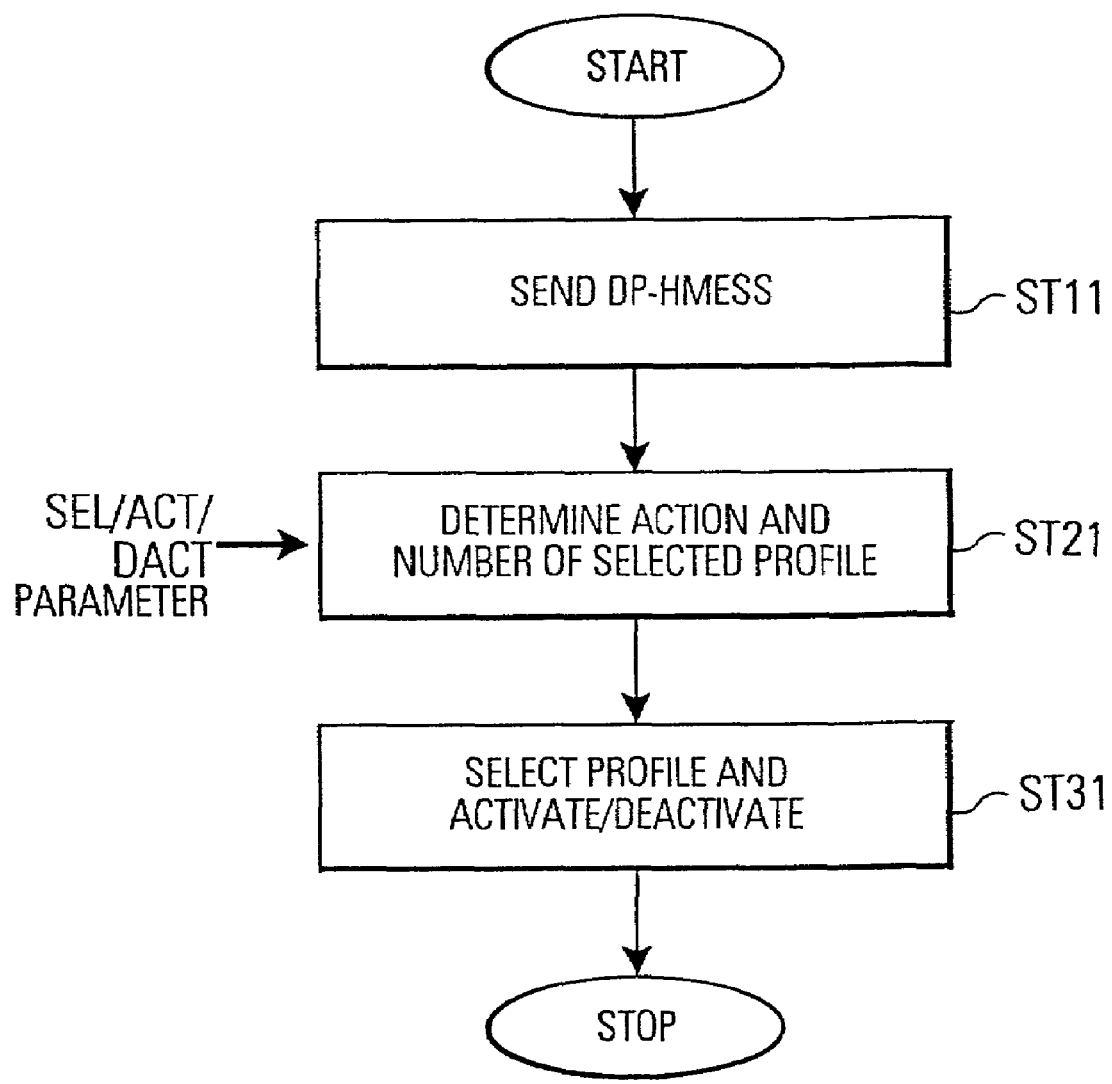
FIG. 6 shows a method according to a first embodiment of the invention.

According to a first embodiment of the invention as explained above, the PCS destination profile handling means DP-HM comprises an activation/deactivation means ACT/DACT for selecting and activating/deactivating a predetermined one of said destination location profiles DPm in said PCS destination profile memory DP-MEM in response to a selection/activation/deactivation handling parameter SEL/ACT/DACT in the destination profile handling message DP-HMESS which indicates a predetermined destination location profile DPm to be selected/activated/deactivated as shown in FIGS. 5a, 6.

As shown in FIG. 6, in step ST11 the destination profile handling message DP-HMESS including a selection/activation/deactivation handling parameter SEL/ACT/DACT is sent to the PCS server. In step ST21 the ACT/DACT means determines the desired action (activation/deactivation) and the number of the selected profile DP which is to be activated/deactivated on the basis of the handling parameter. In step ST31 the indicated predetermined one of the destination location profiles DPm in said PCS destination profile memory DP-MEM is selected and activated/deactivated by an active destination profile determining means in said routing means in response to the selection/activation/deactivation handling parameter contents which indicate the predetermined destination location profile to be selected/activated/deactivated. The default setting means DEF-SM can cooperate with the active destination profile determining means, e.g. to indicate a default active destination profile. A user can also activate or deactive said default destination profile via the handling message.

For example, if the PCS subscriber has dialed the PCS-SERV-number associated to the PCS-server and a call has been set up to the PCS-server, a combination of digits 0–9 and symbols *, # can be sent as part of the selection/activation/deactivation parameter. This combination of digits and symbols may indicate the desired action i.e. activation or deactivation, and the number of the destination profile to be selected. For example, the user can provide the SEL/ACT/DACT parameter through a procedure using DTMF tones to activate or deactivate the PCS.

The activation/deactivation can relate to a specific destination profiles or can relate to the entire activation/deactivation of the PCS communication system. For example, if only one destination profile is provided for the specific PTN number, then of course the activation of the single destination profile corresponds to an activation of the PCS service. If on the other hand several destination profiles are used and a default one is set by the system administrator, then the selection and deactivation of this default destination profile will deactivate the complete service. However, in the simplest case the SEL/ACT/DACT parameter included in the handling message DP-HMESS can just indicate the switching on/off (activation/deactivation) of the complete PCS server for the specific PCS subscriber.

As also indicated in FIG. 5a, the destination profile handling means comprise an authorization check means ID-CHECK for checking the user authorization of the received destination profile handling message DP-HMESS. In this case the destination profile handling parameter also includes a user authority code or a PIN (personal identity number). That is, during the procedure for handling a specific destination profiles, the handling means DP-HM will first check the user authorization after receiving the handling message DP-HMESS. This ensures that the PCS subscriber requesting the handling can only change such destination profiles which relate to his/her own PCS subscription. Therefore, a PCS user can not handle or configure destination profiles of other PCS subscribers. It should be noted that the user identification check can be used in connection with all handling messages used in the various embodiments of the present invention as described herein.

As explained above, according to the first embodiment of the invention as shown in FIG. 6 and in FIG. 5a, the predetermined handling or configuration relates to the activation/deactivation of the personal communication service and/or predetermined destination profiles by the user. Therefore, the user does not have to contact the system administrator or to use a configuration tool in order to activate/deactivate a desired destination profile.

Finally, it should be noted that there are also made provisions in the PCS system or PCS server if no active destination profile is present. In this case, a default number attends to the user's PTN calls. This default number is set in the PCS server or in the memory DP-MEM for each PCS user.

Second Embodiment (Switching of Profiles)

According to the second embodiment of the invention, the destination profile handling means DP-HM comprises a destination profile switching means DP-SWM (as shown in FIG. 5a) for switching between predetermined ones of said destination profiles DPm in said PCS destination profile memory DPM in response to a destination profile switching parameter DP-SWP contained in the destination profile handling message DP-HMESS.

Figure 7B:
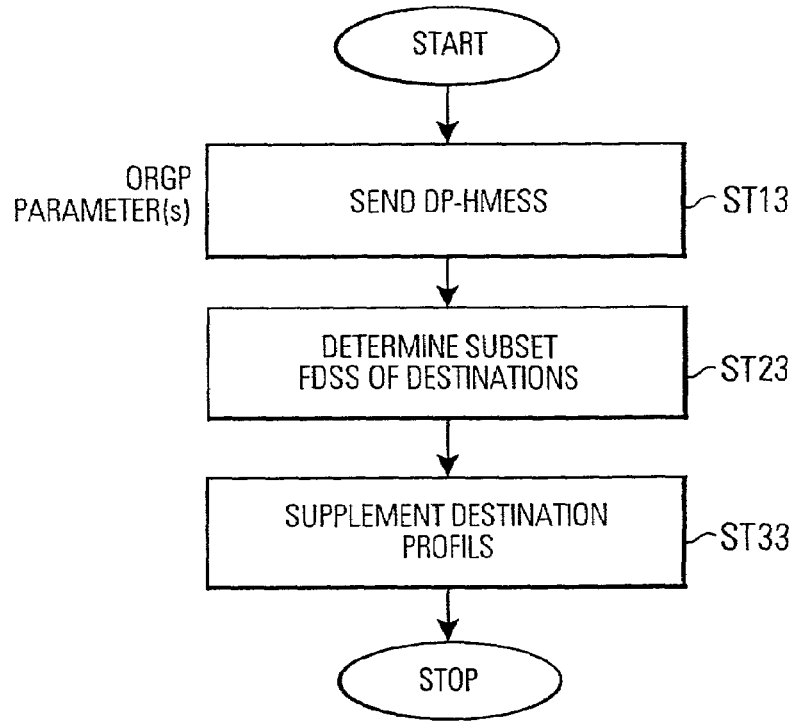
Figure 7B:
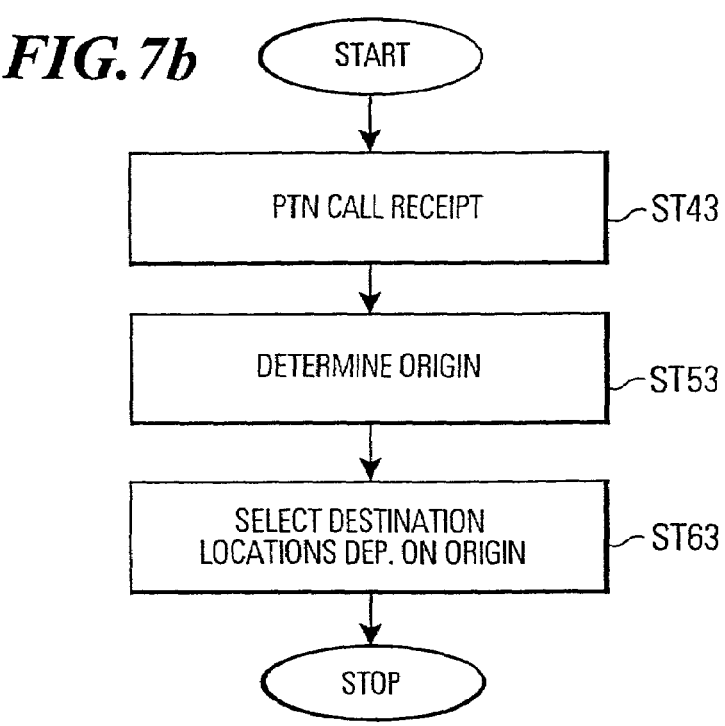

As shown in FIG. 7, in step ST12 the PCS user sends a DP-HMESS message including a switching parameter DP-SWP. In step ST22 the DP-SWM means determines the profile to be switched to on the basis of the DP-SWP parameter. In step ST23 the switching means DP-SWM switches to the indicated destination profile.

Therefore, the PCS subscriber is provided with the possibility to change the selected sequence by a procedure again dialed from the PCS user telephone. The second embodiment assumes that possible sequences in the destination profiles have been configured according to the user needs when the subscriber had subscribed to the service, either by the system administrator or by the user him/herself (if the system allows to do it by means of a configuration tool or similar).

According to the second embodiment each time the user want to change or switch the selected profile he/she can set up a call to PCS server and send a message containing the number of the new selected profile. If the user is outside the PCS network the solution is the same as in the first embodiment. If the user is inside the PCS network, then the procedure is different to the first embodiment. Again, the switching parameter DP-SWP can comprise a combination of digits 0–9 and/or symbols *, # which indicate a switching request and the number of desired destination profile to be switched to. The destination profile handling message is issued by a handling request means of the PCS subscriber telephone located within or outside the PCS communication system.

As in the first embodiment, a user authority code PIN (personal identity number) can also be included in the switching procedure.

As explained above, according to the second embodiment of the invention, in case of an activated destination profile, the user can send a message to the PCS server for switching from the presently active destination profile to a new desired active profile. Therefore, in the second embodiment the predetermined handling or configuration relates to the switching between individual destination profiles.

Hereinafter, embodiments of the invention will be described how call distribution criteria can be set in addition or separately to the aforedescribed handling of the destination profiles. Also some embodiments of the invention how the calls are delivered in accordance with the call distribution parameters according to the invention will be described.

Third Embodiment (Call Distribution (Origin) Parameters)

As explained above, in a destination profile a sequential set of destination locations (destination location numbers) are included and the PCS routing means will route the calls sequentially to the destination locations as indicated by the destination profile. However, this does not allow the user to indicate specific destinations in the destination profile which should be used dependent on specific call distribution criteria, for example the specific origin of a call placed by the calling party.

According to the invention the destination profile handling means DP-HM comprises a call distribution parameter setting means CDP-SM for setting call distribution parameters in said one or more destination profiles. These call distribution parameters can be set via the handling message being issued by the system dependent on operating conditions of said PCS system and/or said telephone system or by the PCS user.

The all distribution parameter setting means CDP-SM can comprise a first destination subset determining means FDSS-DM and/or a second destination subset determining means SDSS-DM and/or a busy option setting means BO-SM and/or a PTN number of calls parameter setting means NOCP-SM and/or a PTN number of calls flag setting means NOCF-SM. The PCS routing means can comprise an origin determining means ORG-DM and/or a teleservice-type determining means TELE-DM and/or a busy state determining means BSAT-DM and/or a PTN number of calls determining means NOC-DM and/or a PTN number of calls parameter determining means NOCP-DM and/or said active destination profile determining means ADP-DM as will be explained below with respect to the different embodiment which can be carried alone or in combination.

As shown in FIG. 5c and in FIG. 8, once some additional call distribution parameters have been set by the user (or the system) a call delivery can take place as follows. That is, one or more of said destination numbers PDNn have associated with them one or more call distribution parameters, e.g. ORGP, TELEP, BOP, NOCP, NOCF and an incoming PTN call is routed to destination locations in said destination profile in accordance with the sequence indicated in a destination profile and said one or more call distribution parameters until said call is abandoned or answered.

As explained above, the PCS routing means PCS-RM can comprise an active destination profile determining means ADP-DM for determining an active destination profile DPm in said destination profile memory DP-MEM. Therefore, in FIG. 5c, said PCS routing means PCS-RM routes said incoming PTN call in accordance with the call distribution parameters set to said active destination profile.

The active destination profile can be a default destination profile set by a default setting means DEF-SM of said destination profile handling means DP-HM or an active destination profile DPm selected by said selection/activation/deactivation handling parameter SEL/ACT/DACT and/or said switching parameter SMP as explained above.

According to the third embodiment of the invention, the call distribution parameter setting means CDP-SM comprises a first destination subset determining means FDSS-DET shown in FIG. 5a to determine a subset of destinations of at least one destination profile which will attend to a received PTN call on the basis of a PTN call origin parameter included in the destination profile handling message (sent by the user or the system) and indicating the call origin of an issued PTN call.

As shown in FIG. 7a, the PCS user (or the system) can send a message DP-HMESS in step ST13 including one or more PTN call origin parameters ORGP and in step ST23 the first destination subset determining means determines on the basis of the call origin parameter a desired subset of destination locations to be selected sequentially for a specific call origin of a PTN call. In step ST33 the destination profiles are supplemented by setting a call origin parameter ORG to the destination profile DP' as shown in FIG. 8 by said SSDM-SM means. For example, in FIG. 8 the first destination location PDN1 has been supplemented by a call origin parameter which indicates that this destination location can only be selected for calls originating from "089" numbers (e.g. from Munich). Likewise, the destination location PDN3 is marked as only receiving numbers from "0221" (e.g. from Cologne). Other type of call origin parameters can be set, e.g. to PDN2 only calls outside the PCS subscriber's company and be routed. The destination location PDNN has a wild card, e.g. it can be used for calls from all call origins.

If the destination profile DP' has been supplemented by call origin parameters (each destination location can have a different or even several call origin parameters for allowing call of several origins to be routed there, e.g. Munich AND Cologne) by the first subset determination means FDSS-DET, then a method for routing a PTN call in accordance with the destination profile is carried out according to FIG. 7b.

In step ST4 a calling party issues a PTN call which is received in the PCS-server. The origin of the PTN call is determined by a call origin determining means ORG-DM (e.g. it can be screened by the PCS system and/or the interconnected telephone system) and is provided to the PCS server in the PTN call setup message. The first subset determination means FDSS/DET in connection with the PCS routing means (e.g. the call origin determining means ORG-DM) now determines in step ST6 a subset of suitable destination locations in the active destination profile DP' (which can be selected beforehand with the same handling message which is possibly used for the setting of the call origin parameters) by comparing the call origin parameter included in the PTN call setup message with the call origin parameters provided in the destination profile DP'. In step ST6 the PCS routing means sequentially selects destination locations which have been marked by the call origin parameter as suitable for the type of call origin.

It should be noted that various types of call origin parameters can be used. For example, types of call origin can be determined based on:
a) Originator location, e.g.:
   originator is in the public network;
   originator is in his/her own system (same system as PCS subscriber);
b) Originator type, e.g.:
   operator (PBX operator or network operator)
   emergency extension;
c) Originator number:
   screening based on type of number;
   screening based on numbering plan identification;
   screening based on originator's number: whole number or part of it.

As explained above, according to the third embodiment of the invention, a parameter can be added in the PCS server to state the origin of the calls to be delivered to each destination. When the delivery of a PTN call is requested, the origin of the call is provided to the PCS server. Of course, the number of types of call origin can depend on the ability of the telephone system to know the call origin, based on the information received from the signalling system through which the incoming call is received (i.e. if the signalling system can convey some information about the origin of the call: location and/or type of originator). Furthermore, it depends on the ability of the telephone system to know the call origin, regardless the used signalling system through which the incoming call is received (i.e. if for example the telephone system can associate a given incoming trunk with a given origin type). Furthermore it will depend on the PCS implementation ambition.

However, according to the third embodiment, as explained above, the destination profiles can be handled in a very specific way to include as decision parameter for the sequential routing of a received PTN call also in accordance with the call origin.

Fourth Embodiment (Teleservice-Type)

According to the fourth embodiment the destination profile handling message DP-HMESS (send by the user of set automatically by the system) comprises a PTN call teleservice-type parameter TELEP indicating the teleservice-type of an issued PTN call and the destination profile handling means DP-HM comprises a second destination subset determining means SDSS-DET to determine a subset of destinations of at least one destination profile which shall attend to the PTN call on the basis of a set PTN call teleservice-type parameter TELEP, as shown in FIG. 5a and in FIGS. 9a, 9b.

As shown in FIG. 9a, a destination profile handling message DP-HMESS including the desired teleservice-type parameter TELEP is sent to the PCS server PCS-SERV in step ST14 (by th user or the system). The second destination subset determining means SDSS-DET of the destination profile handling means DP-HM as shown in FIG. 5a then determines on the basis of the teleservice-type parameter(s) TELEP a number of destination locations which only relate to the specifically indicated teleservice-type in step ST24.

One possibility is that the SDSS means simply sets the sent TELEP parameters at the indicated positions in the destination profiles. Another possibility is that the handling message teleservice-type parameter only indicates the fact that a teleservice-type determination is to be made. In this case, the system automatically scans the respective destination locations in order to find out the types of teleservice supported at each location. Then, one or more teleservice-type parameters can be set in accordance with the found teleservices at each destination location.

As shown in FIG. 8, the SDSS means may determine (or be advised through the handling message from the user) that the destination locations PDN1, PDN3 have only been connected to FAX terminals and that the destination location PDN2 only relates to a video terminal. If for example the parameter TELEP indicate that PDN1, PDN3 only relate to FAX, then the SDSS means will set in step ST34 in the column TELEP in the destination profile DP' in FIG. 8 the respective indications of the allowed types of calls, i.e. FAX, video etc. Thus a second subset of destination locations have been allocated special call distribution criteria relating to the teleservice-type in step ST34. The associated parameter at each destination in the destination profile provides information which calls can be attended by the destination location according to the requested teleservice. As explained the parameters TELEP in the profile DP' can also be automatically set by the PCS-server or the telephone network after recognizing what type of receiving apparatus is connected to the respective destinations.

A call delivery can take place as shown in FIG. 9b when only regarding the TELEP parameter as the relevant call distribution criteria in FIG. 8. In step ST44 the PTN call is received in the PCS server. In step ST54 the second destination subset determining means SDSS-DET in connection in with the teleservice determining means TELE-DM determines the requested teleservice in the PTN call. On indication of the type of teleservice can be provided for example be screened by the telephone system and/or the PCS system. On the basis of the screened requested teleservice the SDSS-DET means will determine in step ST64 the allowed destinations which are appropriate for handling the specific teleservice-type. If for example the screened and requested teleservice relates to FAX, then the routing means PCS-RM will distribute the requested call sequentially only from PDN1 to PDN3 and to any other destination locations which have TELEP parameter set to "FAX". Since PDNN can receive all types of calls also the PDNN destination location is used for receiving the FAX call.

It should be noted that the determining of call origin parameters in step ST54 and the selection of destinations in step ST64 considering the requested teleservice-type can be combined with the determining and selection of destination locations depending on the call origin in steps ST53, ST63 in FIG. 7b, i.e. the two parameters ORGP and TELEP supplemented to the destination profile DP' in FIG. 8 due to the destination profile handling can be used together when the call origin and the teleservice-type is screened. That is, logical combinations of the two parameters can be pre-set, i.e. PDN1 is only used if the call origin comes from a "089" number AND if the call is additionally relating to a "FAX" call. Other combinations like OR, XOR etc. can be used. Such logical combinations can be preset by the system or the user, e.g. by adding a combination parameter in the destination profile handling message.

The number of types of teleservice can be more or less extensive depending on:
a) The ability of the telephone system to know the requested teleservice based on the information received from the signalling system to which to incoming call is received (i.e. if the signalling system can convey some information to determine the requested teleservice).
b) The ability of the telephone system to know the requested teleservice regardless of the signalling system through which the incoming call is received (i.e. if for example the serving system can associate a given incoming trunk with a given teleservice-type).
c) The PCS implementation ambition.

Persons skilled in the art will recognize that any mechanism available in the PCS communication system or in the interconnected telephone network capable of providing the teleservice-type to the PCS server can be used depending on the network implementation. Therefore, it is not necessary here to explain in more detail how the teleservice-type is provided. For example, types of teleservice can be determined based on:
a) Information elements (such as BEARER CAPABILITY and/or HIGHER LAYER COMPATIBILITY) received from the signalling system through which the incoming call is received. Some of the standard documents explicitly state how to determine the teleservice based on received information elements (e.g. ETS300196 provides a table to determine the teleservice-type based on the received BEARER CAPABILITY and/or HIGHER LAYER COMPATIBILITY);
b) Originator type, i.e. a teleservice is associated per originator-type (e.g. if originator-type is "data extension", then the teleservice-type is "unrestricted digital information");
c) Originator number, i.e. a teleservice may be associated based on a received calling number.

Other possibilities can be used for screening the teleservice-type of a received PTN call. As an example, a set of teleservice-types to be used as the call distribution criteria e.g. set in the destination profile DP' in FIG. 8 can be:
speech;
3.1 kHz audio (modem/FAX);
unrestricted digital information;
video telephony;
telephony 7 kHz.

The possibility to set special call distribution criteria via the destination profile handling message in FIG. 9a and the possibility to route a received PTN call on the basis of the requested teleservice avoids attempting all destinations until reaching a compatible device to attend the incoming type of call since this would be a waste of time and system resources.

Fifth Embodiment (Busy Option Determination)

A sequence may contain several destinations which are attended by the same person (the user). If one of them is busy, attempting the other destinations would be a waste of time and system resources. According to the fourth embodiment of the invention a destination and a sequence may be appointed to attend the calls that find a busy destination for a specific type of call. However, it could happen that the next selected destination is also busy and therefore the fifth embodiment of the invention allows to set call distribution criteria relating to a busy state of a selected destination location.

In step ST15 in FIG. 10a a destination profile handling message DP-HMESS (sent by the user of the system) comprising busy option parameters BOP is received by the PCS server. The busy option parameters BOP indicate busy options for the destination locations of said destination profiles, in particular they indicate for a particular destination location either a further destination location in the destination profile to which a PTN call is to be routed by the PCS routing means in case the particular destination location is busy, or the issuance of a busy indication to the calling subscriber.

In step ST25 a busy option set means BO-SM (see FIG. 5a) sets in the destination profile DP' shown in FIG. 8 or in FIG. 10c busy options in step ST35 in response to the respective parameter in the handling message. As shown with more details in FIG. 10c, if the extension X, the DECT phone, the mobile telephone or the home extension having the sequence numbers 1, 3, 4, 5 in the destination profile DP' are busy, then the destination location "secretary 1" having the sequence number 6 is selected. Alternatively, since the busy option "Give Busy" has been set for the extension Y, a busy indication is returned to the calling subscriber. If the "secretary 1" is busy, then the "secretary 2" is attempted next. If "secretary 2" is busy, then the "voice mail" is attempted. If the "voice mail" is also busy, a busy indication is provided. The BOP parameter is also shown as an additional call distribution criteria in FIG. 8.

In order to avoid a looping between the destination locations in the destination profile the "busy option" for a certain destination must be a subsequent destination in the destination profile. That is, the sequence number indicated in the righthand column in FIG. 10c must always be higher than the sequence number of the sequential listing in the lefthand column.

Figure 10B:
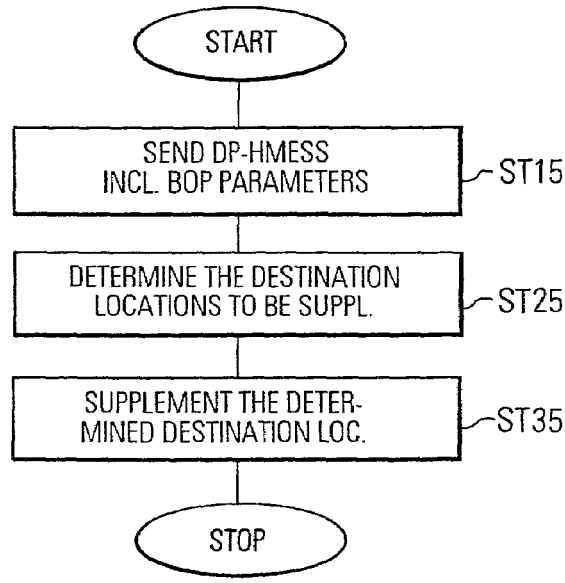
Figure 10B:
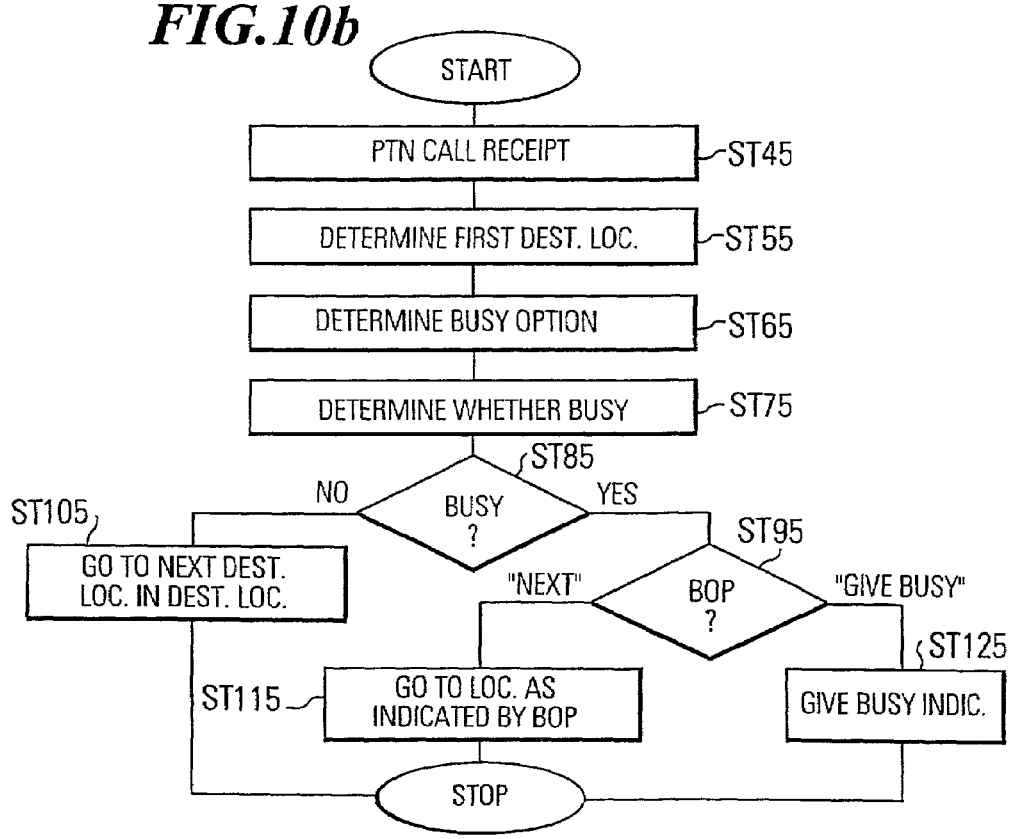

If a busy option parameter setting has been performed by using the handling message with the BOP parameters in FIG. 10a, then a call delivery will take place in accordance with FIG. 10b. In step ST45 the call is received and a first destination location to which the call is to be routed is determined in step ST55. In step ST65 the busy option parameter BOP set in the destination profile at the first destination location is determined and in step ST75 it is determined by a busy state determining means BST-DM of the PCS routing means PSC-RM whether the first destination location is busy. If the first destination location is determined not to be busy in step ST85, then the next location in the ordered sequence is attempted in step ST105 by the PCE routing means. That is, if the desired first destination location is not busy and e.g. after a predetermined time no answer is received, then the conventional next destination location in the destination profile is selected for the routing.

If indeed it is determined in step ST85 by said busy state determining means BST-DM that the first destination location is "busy", then the busy option parameter BOP is checked for this first destination location in step ST95. If the BOP parameter indicates that a busy indication is to be returned to the calling subscriber, then step ST125 returns a busy indication to the calling subscriber. If the BOP parameter indicates that in case of a busy condition the next indicated destination location is to be selected, then the procedure goes to the step ST115 where the next destination location as indicated by the BOP parameter is selected.

By using the setting and the delivery according to FIGS. 10*a*, 10*b* the user can advantageously appoint a different destination for each one of the destinations in the sequence to forward the call in case of busy. For example, "if my company extension is busy, I want my secretary to attend the call, but if my home telephone is busy, I want the call to be forwarded to a voice mail system" can be set by the user thus increasing tremendously the flexibility how the call distribution is to be made.

As explained above with reference to the combined usage of the ORGP and TELEP parameter, it should also be noted that the call distribution using the BOP parameter can be combined with a logical combination with one or more of the TELEP and ORGP parameters. That is, the call origin and/or teleservice-type and/or busy option setting in FIGS. 7*a*, 9*a*, 10*a* can be combined. Likewise, the call delivery can be made dependent on the call origin and/or the teleservice-type and/or the busy option parameter in step ST63 and/or ST64 and/or step ST65, ST75, ST85, ST95, ST105, ST115, ST125.

Sixth Embodiment (PTN Number of Calls Determination)

Figure 4:
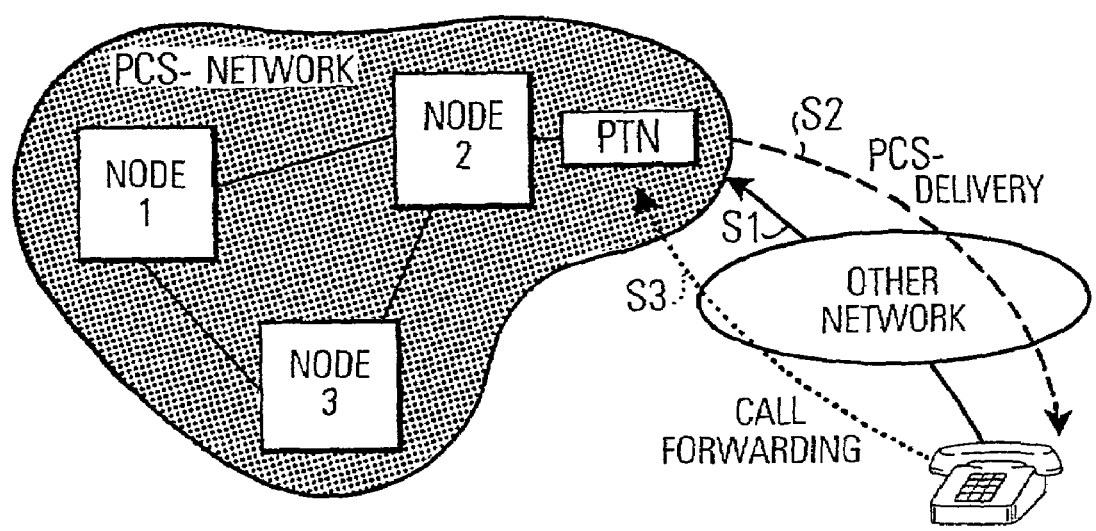
FIG. 4 shows a problem of the prior art if a personal communication system routes a PTN call back to a calling terminal where a call forwarding is activated to forward the call back to the PTN number.

As was explained with reference to FIG. 4, problems can occur if more than one PTN call is delivered to one destination location causing interactions between a personal communication system and other possible redirecting services. During such looping effects a lot of system resources will be spent without any sense since in any case the call will never be answered, however occupies system resources.

According to the sixth embodiment the PCS subscriber or the system can send a handling message DP-HMESS including a number of calls parameter NOCP in step ST16 in FIG. 11*a*. The number of calls parameter indicates for at least one destination location in said destination profiles whether one or more than one call can be delivered to the destination location. In step ST26 a PTN number of calls parameter setting means NOCP-SM determines at which destination locations a number of call parameter NOCP is to be set on the basis of the sent NOCP parameters. In step ST36 the PCS server or more particularly the call delivery determination means CDDM sets the respective NOCP parameters at the destination locations as for example shown in FIG. 8. For example, in FIG. 8 the destination locations PDN1, PDN2 can only receive one call and the destination locations PDN3, PDNN can receive more than one call.

Therefore, as shown in FIG. 11*a*, FIG. 8, a parameter NOCP is associated to each destination location to state if only one PTN call or more than one PTN call can be delivered to the destination at the same time. This "one call" parameter can be set when the user profile is configured in the PCS server or it can be set according to FIG. 11*a*.

As shown in the most righthand column in FIG. 8, in addition to NOCP parameter, a NOCF flag (number of calls flag) can be set by a PTN number of calls flag setting means NOCF-SM as an additional call distribution criteria in the destination profile DP'. This flag is dynamically set in the destination profile during the call delivery procedures and are usually not set beforehand by the user. The flag indicates whether a call is already being delivered to a particular destination, i.e. it is set at one or more destinations if a call is already delivered and it is not set or reset if no call is being delivered. This number of calls flag NOCF can be used alone or together with the number of call parameter NOCP as shown in FIG. 11*b*. The procedure by only using NOCF flag follows the dashed flow in FIG. 11*b* and the combined usage of NOCF and NOCP follows the continuous flow lines in FIG. 11*b*.

In step ST47 the PCS server (i.e. a PTN number of calls determining means NOC-DM) makes an analysis of the present state of the destination locations in the presently active destination profile DP'. The NOC-DM means at least checks the first destination where the incoming PTN call is to be delivered. If the destination is already receiving a call, then the NOCF flag is set in the destination profile DP' at such destination locations. By so doing, a flag is associated to each destination to inform if a PTN call is already being delivered to the destination.

If the PTN call is received in step ST57 and is directed to a first destination, it is checked in ST67 whether the NOCF flag is set. If it is not set, then the call is routed to the desired destination location in step ST87. If in step ST77 the flag has been set, i.e. a call is pending at this destination location, then the procedure follows the dashed flow path in FIG. 11*b* and the call is routed to the next destination in the sequence in step ST107. That is, the destination where the flag is set is skipped and the call is delivered to the next destination in the profile. At the next destination location the checking of the flag there is again performed, i.e. the procedure in FIG. 11*b* starts again from step ST57 or ST47.

However, as also indicated in FIG. 11*b* with the continuous line, a call delivery using the NOCF flag can be combined with the NOCP parameter in step ST97. That is, if the NOCF flag is set, the number of call parameter NOCP is checked by a PTN number of calls parameter determining means NOCP-DM and if this parameter NOCP indicates that "more than one call" can be delivered to the desired destination, the incoming PTN call is routed to the destination location in step ST117. If the number of call parameter NOCP is set to "one call", then the call needs is to the next destination in the sequence in step ST107.

As explained before with respect to the combined use of the ORGP, TELEP, BOP parameters, also the NOCP parameter and/or the NOCF flag can be used together with the other parameters as indicated in FIG. 8. Thus, the PCS subscriber and the PCS system can set very flexibly a number of call distribution parameters in a combined way in order to achieve a higher flexibility when delivering the call. As explained above, a combination of all the call distribution parameters in FIG. 8 can also be indicated or preset by the user or the system in the handling message.

Seventh Embodiment (Combined Call Distribution Parameters)

As shown in FIGS. 12a, 12b, the respective methods of the first to seventh embodiments can be combined to provide a flexible delivery of the PTN calls.

As shown in step SC1 in FIG. 12a, the telephone system supplies a dialed personal telephone number and the call origin and the requested teleservice to the PCS server. In step ST2 the PCS server determines the active profile. As explained above, the active destination profile can be selected and activated or switched by the PCS user. In step SC3, the PCS server (the PCS routing means) retrieves the call distribution data associated to the first destination in the active profile (number 1 in DP' in FIG. 8).

In steps SC4, SC5, SC6, SC7 the selected destination is checked regarding its qualification for the indicated call origin, requested teleservice and whether or not a previous PTN call is already being delivered to the selected destination. In step SC7 the selected destination is checked regarding its qualification whether one or more calls are delivered to it. A new destination in the active profile is selected in step SC8 if the answers to each of the steps SC4, SC5, SC7 are respectively no, no, yes. If there is no previous PTN call determined according to step SC6, then of course step SC7 need not be carried out.

In step SC9, the selected destination is suitable for the call origin, the requested teleservice and only the present call is being delivered or another call is already pending, however the destination is qualified as being suitable for more than one call. In step SC9 the busy option must be determined, i.e. whether another destination is to be selected in case of a busy destination or whether a busy indication is returned to the calling subscriber.

In step SC10 in FIG. 12b the call is being delivered to the selected destination and if the call is abandoned or completed in step SC11, then the system exits. In step SC12, a determination is made whether the selected destination is busy or not. If the destination is not busy and a predetermined time period has expired without a call being abandoned or completed in step SC13, then a next destination is checked in the selected profile in SC15. if there are no further destinations, then the procedure exits. If indeed there are more destinations, the next destination in the active profile is selected in step SC17. Since step SC17 relates to a situation where the selected destination is not busy, simply the next (sequential) destination in the active profile is selected. Thereafter, the new combination of call origin, requested teleservice, number of calls etc. is checked for the new destination from node L1 in FIG. 12a.

Alternatively, if the destination is determined to be busy in step SC12, then in step SC14 it is determined whether the BOP parameter indicates another destination location to be used because the present destination is busy. In step SC18 the telephone system informs the PCS server that the selected destination is busy and in step SC19 the PCS server retrieves a new destination location indicated in the BOP parameter. This new destination location is then again checked from node L1 in FIG. 12a.

Alternatively, if in step SC14 it is determined that a busy indication is to be returned as indicated by the BOP parameter, then in step SC16 the telephone system clears the PTN call and returns a busy indication to the calling subscriber whereafter the procedure comes to an end.

As can be seen from FIGS. 12a, 12b, this procedure of using the call distribution criteria shown in FIG. 8 relates to an AND combination of the respective parameters (see the sequential steps SC4, SC5, SC6, SC9, SC12). However, the skilled person can derive other combinations like OR, EXOR etc. according to the specific call delivery method desired.

Additional Embodiments

As explained above the PCS-server according to the prior art routes an incoming PTN call sequentially to the destination locations in accordance with an active destination profile (which in the prior art is for example set according to a time schedule).

A first aspect of the invention is that a destination profile handling message is used to apply a predetermined handling to one or more of the destination profiles associated to the PCS subscriber. In this case, the PCS-server will route an incoming PTN call in accordance with the specially handled destination profile (s).

A second aspect of the present invention is that the PCS-server contains destination profiles which have been supplemented with one or more additional call distribution criteria. In this case the PCS-server performs the routing of an incoming PTN call in accordance with the one or more additional call distribution parameters set in the respective destination profiles. Some of the additional call distribution parameters can be set by the PCS system itself, i.e. the NOCF (number of call flag) parameter and others are set via the call handling message and by the PCS subscriber, i.g. the ORGP parameter and/or the TELEP parameter and/or the BOP parameter and/or NOCP parameter. If the PCS-server only uses call distribution criteria which have been set by the PCS system (or the interconnected telephone system), then a special destination profile handling message need not be sent by the PCS subscriber beforehand. That is, in this case the PCS-server performs the routing merely dependent on the call distribution criteria set by the system (s). Alternatively, as also described above, the PCS-server routes the calls in accordance with the call distribution parameters set via the sending of a destination profile handling message with specific parameters to the PCS-server. The routing performed by the PCS-server thus takes place in accordance with call distribution parameters set by the PCS subscriber and/or call distribution parameters set by the system.

A third aspect of the invention relates to the fact that the call handling message performs a special selection and activation/deactivation of desired destination profiles. Therefore, the PCS-server performs a routing in accordance with a specially selected/activated or switched destination profile as described above in the various embodiments.

Of course the third aspect can be combined with the second aspect, i.e. that the selection/activation or switching (handling) message is combined with the setting of call distribution criteria in the thus selected/activated or switched destination profile. For example, the PCS user may desire to activate a desired destination profile and simultaneously (or by sending successive call distribution parameter setting messages) set desired call distribution criteria in the destination profiles. On the other hand, if always a default destination profile is allocated by the PCS-server, then the PCS user does not have to send the selection/activation or switching message and can only send a message to set the call distribution criteria in the default destination profile. Alternatively, if the PCS-server does not have automatically the default destination profile switched on, then the user will send an activation message to activate even the default destination profile.

As also explained above, during the setting of call distribution criteria in the desired destination profile, the user can also pre-specify certain combinations (logical combinations) of the call distribution parameters independently as to whether they have been set by the user or have been set by the system. By doing so the PCS user can flexibly configure his/her destination profiles.

Also other combinations are possible. For example, the call distribution criteria discussed above can be set together with other parameters used by the system, e.g. time stamps allocated to each destination location. The PCS-server can also prioritize certain calls above other calls. For example, a priority flag indicating that a FAX has a lower priority than a speech call (when being routed to the same destination location) can be set. The skilled person can derive various other combinations of parameters which are available in the PCS system or the interconnected telephone system. Therefore, the invention is not limited to the special embodiments described herein.

INDUSTRIAL APPLICABILITY

As explained above, the concept of the present invention lies on the one hand in the flexible handling (selection and activation/deactivation and switching) and setting of call distribution criteria (ORGP, TELEP, BOP, NOCP) in the active (selected) destination profile and on the other hand to the call delivery using such sets of set call distribution parameters. Thus, the PCS subscriber has the possibility to configure his/her profiles according to the different criteria and can select the most suitable one for each moment in an easy way. Provided that the most suitable profile is selected by the PCS subscriber, the calling party to a personal telephone number does not have to wait for a long time until the call is answered. The PCS provider can save system resources, since some unsuccessful deliveries of the PTN calls can be avoided.

In particular the possibility to have several profiles and select by a procedure or a telephone call the most suitable one for each moment gives the user a high mobility and flexibility and this saves time in system administration. The possibility to deliver the PCS calls to certain destinations depending on the origin allows the user to appoint a destination to attend a specific type of call. The possibility to deliver the PCS calls to certain destinations depending on the requested teleservice avoids unsuccessful deliveries so that again system resources are saved. The possibility to have an individual option of each destination in the profile to continue the PTN call distribution in case of busy increases the probability that the call will be attended by someone. The possibility to limit the delivery of PCS calls to only one call for certain destinations protects the telephone system against looping of calls such that system resources are saved and error situations are avoided.

Such procedures and advantages can be used independent of the implementation of the PCS communication system and independent of the interconnected telephone system. Therefore, the invention is applicable to all implementations of PCS communication systems and all telephone systems.

Furthermore, the invention is not limited to the specific described embodiments which are presently viewed as the best mode of the invention. Various variations and modifications of the invention can be carried out by skilled person based on the disclosure in the claims and in the description. In particular, the invention comprises embodiments including features which have been separately claimed in the claims or described in the description.

Reference numerals in the claims only serve clarification purposes and do not limit the scope of the invention.

What is claimed is:

1. A personal communication system (PCS) server of a personal communication system providing PCS subscribers with personal telephone numbers, comprising:
   a PCS destination profile memory for storing in association with at least one personal telephone number (PTN) a number of destination profiles respectively consisting of a sequence of destination numbers indicating a number of predetermined destination locations;
   a PCS routing means for completing an incoming call directed to said PTN by routing the incoming call sequentially to destination locations in accordance with the sequence indicated in a destination profile until said call is abandoned or answered; and
   a destination profile handling means, comprising a call distribution parameter setting means for setting said call distribution parameters in at least one destination profile, for selectively handling one or more of said destination profiles stored in said PCS destination profile memory in response to a destination profile handling message received via said PCS communication system and including at least one handling parameter indicating a predetermined handling of said at least one of said destination profiles,
   said at least one handling parameter indicating one or more call distribution parameters selected from a group of call distribution parameters that include a PTN call origin parameter, a PTN number of calls parameter and a PTN number of calls flag for one or more of said destination locations in said one or more destination profiles.

2. The PCS server according to claim 1, wherein said destination profile handling means comprises an activation and deactivation means for selecting and activating or deactivating a predetermined one of said destination location profiles in said PCS destination profile memory in response to a handling parameter having selection, activation and deactivation options in said destination profile handling message indicating said predetermined destination location profile to be selected and activated or deactivated.

3. The PCS server according to claim 1, wherein:
   said PCS server associated with a predetermined PCS server number to which said destination profile handling message is routed.

4. The PCS server according to claim 3, wherein:
   said PCS server further comprises a voice message storage means for storing predetermined voice messages provided to a PCS subscriber by said PCS routing means after said destination profile handling message is received by said PCS server.

5. The PCS server according to claim 2, wherein:
   said handling parameter comprises a combination of digits and symbols which indicate the selection and activation or deactivation and the number of the destination profile to be selected.

6. The PCS server according to claim 1, wherein:
   said destination profile handling message includes a user authority code or a PIN wherein said PCS server further includes an authorization check means for checking the user authorization of said received destination profile handling message.

7. The PCS server according to claim 1, wherein:
   said destination profile handling message comprises a destination profile switching parameter and said destination profile handling means comprises a destination profile switching means for switching between predetermined ones of said destination profiles in said PCS destination profile memory in response to said destination profile switching parameter.

8. The PCS server according to claim 7, wherein:
said destination profile switching parameter comprises a combination of digits and or symbols which indicate a switching request and a number of the destination profile to be switched to.

9. The PCS server according to claim 1, wherein:
said destination profile handling message is issued by a handling request means of a PCS subscriber telephone located within the PCS communication system.

10. The PCS server according to claim 1, wherein:
said destination profile handling message is issued by a handling request means of a PCS subscriber telephone outside the PCS communication system.

11. The PCS server according to claim 1, wherein:
said destination profile handling message is issued from said PCS communication system which sets said handling parameters in accordance with operating conditions of said PCS system and or a telephone system connected to said PCS system.

12. The PCS server according to claim 1, wherein:
several call distribution parameters for one or more destination locations are indicated by the handling parameters and at least one of said call handling parameters also indicates a logical combination for a call routing for said one or more location destinations.

13. The PCS server according to claim 1, wherein:
said destination profile handling message comprises said PTN call origin parameter indicating for one or more predetermined destination locations information regarding originator location of said PTN call or originator number of said PTN call and said destination profile handling means comprises a first destination subset determining means for setting said at least one call origin parameter at one or more of said destination locations in at least one destination profile to determine at least one subset of destinations in at least one destination profile which shall attend to PTN calls having a call origin as indicated by said PTN call origin parameter.

14. The PCS server according to claim 1, wherein:
said destination profile handling message comprises at least one teleservice-type parameter indicating for one or more predetermined destination locations the allowed type of teleservice for a PTN call and said destination profile handling means comprises a second destination subset determining means for setting said at least one teleservice-type parameter at one or more of said destination locations in at least one destination profile to determine at least one subset of destinations in at least one destination profile which shall attend to PTN calls having a teleservice type as indicated by said PTN call teleservice-type parameter.

15. The PCS server according to claim 1, wherein:
said destination profile handling message comprises one or more busy option parameters indicating busy options for said destination locations of said destination profiles, said busy options indicating for a particular destination location either a destination location in said destination profile to which a PTN call is to be routed by said PCS routing means in case the particular destination location is busy, or the issuance of a busy indication to the calling subscriber, said PCS server further comprising a busy option set means for setting said busy options in said destination options.

16. The PCS server according to claim 1, wherein:
said destination profile handling message comprising said PTN number of calls parameter indicating for at least one destination location in said destination profile whether one or more than one call can be delivered to said destination location; and said destination profile handling means further comprising said PTN number of calls parameter setting means for setting said PTN number of calls parameter in said indicated destination location.

17. The PCS server according to claim 1, wherein:
said destination profile handling message comprises one or more PTN number of calls flags indicating for at least one destination location in said destination profile whether a call is being delivered to said destination location or not; and said PCS-server further comprises a PTN number of calls flag setting means for setting said PTN number of calls flags in said indicated destination profiles.

18. A personal communication system (PCS) server of a personal communication system providing PCS subscribers with personal telephone numbers (PTN), comprising:
a PCS destination profile memory storing in association with at least one personal telephone number PTN a number of destination profiles respectively consisting of a sequence of destination numbers indicating a number of predetermined destination locations;
a destination profile handling means for selectively handling one or more of said destination profiles in accordance with one or more handling parameters of a destination profile handling message; and
a PCS routing means for completing an incoming call directed to said PTN by routing the incoming call sequentially to destination locations in accordance with the sequence indicated in a destination profile until said call is abandoned or answered,
wherein one or more of said destination numbers have associated one or more associated call distribution parameters selected from a group of call distribution parameters that include a PTN call origin parameter, a PTN number of calls parameter and a PTN number of calls flag received as a handling parameter in said destination profile handling message and said PCS routing means routes an incoming PTN call to destination locations in said destination profile in accordance with the sequence indicated in said destination profile and said one or more call distribution parameters until said call is abandoned or answered.

19. The PCS server according to claim 18 wherein:
said destination profile handling message is received from a PCS subscriber telephone which sets said one or more handling parameters.

20. The PCS server according to claim 19, wherein:
said one or more handling parameters indicate said one or more call distribution parameters to be set by said destination profile handling means.

21. The PCS server according to claim 19, wherein:
said one or more handling parameter comprises one or more parameters selected from the group consisting of the following parameters said handling parameter having selection and activation or deactivation options and a switching parameter.

22. The PCS server according to claim 18, wherein:
said destination profile handling message is received from said PCS communication system which sets said one or more handling parameters in accordance with operating conditions of said PCS system and or a telephone system connected to said PCS system.

23. The PCS server according to claim 22, wherein:
said one or more handling parameters indicate said one or more call distribution parameters to be set by said destination profile handling means.

24. The PCS server according to claim 22, wherein:
said one or more handling parameters comprises one or more parameters selected from the group consisting of the following parameters: a said handling parameter having selection and activation or deactivation options and a switching parameter.

25. The PCS server according to claim 20, wherein:
said call distribution parameters are selected from one or more parameters selected from the group consisting of a call origin parameter, a teleservice-type parameter, a busy option parameter, a PTN number of calls parameter and a PTN number of calls flag.

26. The PCS server according to claim 20, wherein:
Several of said call distribution parameters are associated with said destination number and said PCS routing means capable of routing an incoming PTN call to destination locations in said destination profile in accordance with the sequence indicated in said destination profile and a logical combination of said call distribution parameters.

27. The PCS server according to claim 26, wherein:
said one or more handling parameters indicate said one or more call distribution parameters to be set by said destination profile handling means: and
said one or more handling parameters also indicates the logical combination.

28. The PCS server according to claim 25, wherein
said PCS routing means comprises a call origin determining means for comparing a call origin of the incoming PTN call with the set call origin parameter at said destination numbers; and
said PCS routing means selects a next destination location in the destination profile if the call origin and the call origin parameter do not match and routes the PTN call to the destination location when they match.

29. The PCS server according to claim 25, wherein:
said PCS routing means comprises a teleservice determining means for comparing a teleservice type of the incoming PTN call with the set teleservice-type parameter at said destination number; and
said PCS routing means selects a next destination location in the destination profile if the teleservice type and the teleservice-type parameter do not match and routes the PTN call to the destination location when they match.

30. The PCS server according to claim 28, wherein
the call origin and or the teleservice type of the PTN call is screened by a call origin/teleservice type determining means of the telephone system or the PCS server and is provided to said PCS server during call setup.

31. The PCS server according to claim 25, wherein:
said PCS routing means comprises a busy state determining means for determining whether a present destination location to which the incoming PTN call is to be routed is busy or not; and
said PCS routing means routes said call to a next destination location as indicated by the busy option parameter at the present destination location if said present destination location is busy and said busy option parameter indicates a next destination location, or returns a busy indication to the calling subscriber if said present destination location is busy and said busy option parameter indicates the issuance of a busy indication.

32. The PCS server according to claim 25, wherein:
said PCS routing means comprises a PTN number of calls determining means for determining whether a call is already being delivered to a destination location to which said incoming PTN call is to be delivered, for setting said PTN number of calls flag when a call is being delivered to said destination location and for resetting said flag if no call is being delivered; and
said PCS routing means routes said incoming PTN call to said destination location if said PTN number of calls flag is set or to the next destination location in the destination profile if said PTN number of calls flag is not set.

33. The PCS server according to claim 25, wherein:
said PCS routing means comprises a PTN number of calls determining means for determining whether a call is already being delivered to a destination location to which said incoming PTN call is to be delivered, for setting said PTN number of calls flag when a call is being delivered to said destination location and for resetting said flag if no call is being delivered; and
said PCS routing means routes said incoming PTN call to said destination location if said PTN number of calls flag is set or to the next destination location in the destination profile if said PTN number of calls flag is not set;
said PCS routing means further comprises a PTN number of calls parameter determining means for determining on the basis of a set PTN number of call parameter whether one or more than one call can be delivered to a desired destination location; and
said PCS routing means routes said incoming PTN call to said destination location if said PTN number of calls parameter indicates that more than one call can be delivered to said destination location, or to the next destination location in the destination profile if said PTN number of calls parameter indicates that only one call can be delivered to said destination location and said PTN number of calls flag is set.

34. The PCS server according to claim 18, wherein:
said PCS routing means comprises an active destination profile determining means for determining an active destination profile in said destination profile memory; and
said PCS routing means routing said incoming PTN call in accordance with the call distribution parameters set to said active destination profile.

35. The PCS server according to claim 34, wherein:
said one or more handling parameter comprises one or more parameters selected from the group consisting of the following parameters: a handling parameter having selection, activation and deactivation options and a switching parameter; and
said active destination profile is a default destination profile set by a default setting means of said destination profile handling means or an active destination profile selected by said handling parameter having selection and activation or deactivation options and or said switching parameter.

36. The PCS server according to claim 18, wherein:
said PCS routing means comprises an active destination profile determining means for determining an active destination profile in said destination profile memory; and said PCS routing means routing said incoming PTN call in accordance with the call distribution parameters set to said active destination profile.

37. A method to control a personal communication system (PCS) server of a personal communication system providing PCs subscribers with personal telephone numbers comprising:
   a) storing in a PCS destination profile memory in association with at least one personal telephone number (PTN) a number of destination profiles respectively consisting of a sequence of destination numbers indicating a number of predetermined destination locations;
   b) completing an incoming call directed to said PTN by routing the incoming call by a PCS routing means sequentially to destination locations in accordance with the sequence indicated in the destination profile until said call is abandoned or answered;
   c) sending a destination profile handling message to said PCS server via said PCS communication system including at least one handling parameter indicating a predetermined handling of at least one of said destination profiles; and
   d) selectively handling one or more of said destination profiles stored in said PCS destination profile memory in accordance with said at least one handling parameter, said at least one handling parameter indicating one or more call distribution parameters, selected from a group of call distribution parameters that include a call origin parameter, a PTN number of calls parameter and a PTN number of calls flag, for one or more of said destination locations in said one or more destination profiles and said call distribution parameter are set in said one or more destination profiles.

38. The method according to claim 37, further comprising:
   in step c), sending in said destination profile handling message a handling parameter having selection, activation and deactivation options; and in step d), selecting and activating and or deactivation deactivating a predetermined one of said destination location profiles in said PCS destination profile memory in response to said handling parameter having selection and activation or deactivation options indicating said predetermined destination location profile to be selected and activated or deactivated.

39. The method according to claim 37, wherein:
   said destination profile handling message is routed to a predetermined PCS server number of said PCS server.

40. The method according to claim 39, further comprising:
   storing in a voice message storage means predetermined voice messages and providing one of the predetermined voice messages to a PCS subscriber after said destination profile handling message is received by said PCS server.

41. The method according to claim 38, wherein:
   a combination of digits and symbols which indicate the selection and activation or deactivation and the number of the destination profile to be selected is sent as said handling parameter having selection and activation or deactivation options in said destination profile handling message.

42. The method according to claim 37, further comprising:
   sending as a destination profile handling parameter in said destination profile handling message a user authority code or a PIN and checking the user authorization of said received destination profile handling message in said PCS server.

43. The method according to claim 37, further comprising:
   in step c), sending in said destination profile handling message a destination profile switching parameter; and
   in step d), switching between predetermined ones of said destination profiles in said PCS destination profile memory in response to said destination profile switching parameter.

44. The method according to claim 43, wherein: said switching parameter comprises a combination of digits and or symbols which indicate a switching request and a number of the destination profile to be switched to.

45. The method according to claim 37, wherein:
   said destination profile handling message is issued by a handling request means of a PCS subscriber telephone located within the PCS communication system.

46. The method according to claim 37, wherein:
   said destination profile handling message is issued by a handling request means of a PCS subscriber telephone outside the PCS communication system.

47. The method according to claim 37, further comprising:
   sending said destination profile handling message from said PCS communication system which sets said one or more handling parameters in accordance with operating conditions of said PCS system and or a telephone system connected to said PCS system.

48. The method according to claim 37, wherein:
   several call distribution parameters are indicated by said one or more handling parameters for one or more of said destination profiles and said one or more handling parameters also indicates the logical combination for said one or more destination locations.

49. The method according to claim 37, further comprising:
   in step c), sending in said destination profile handling message a PTN call origin parameter indicating the allowed call origin for a PTN call; and
   in step d), setting said at least one call origin parameter at one or more of said destination locations in at least one destination profile to determine at least one subset of destinations in at least one destination profile which shall attend to PTN calls having a call origin as indicated by said PTN call origin parameter.

50. The method according to claim 37, further comprising:
   in step c), sending as said destination profile handling message a PTN call teleservice-type parameter indicating for one or more predetermined destination locations the allowed type of teleservice for a PTN call; and
   in step d), setting said at least one teleservice-type parameter at one or more of said destination locations in at least one destination profile to determine at least one subset of destinations in at least one destination profile which shall attend to PTN calls having a teleservice type as indicated by said teleservice parameter.

51. The method according to claim 37, further comprising:
   in step c), sending in said destination profile handling message busy option parameters indicating busy options for said destination locations of said destination profiles, said busy options indicating for a particular destination location either a destination location in said destination profile to which a PTN call is to be routed by said PCS routing means in case the particular destination location is busy, or the issuance of a busy indication to the calling subscriber; and in step d), setting said busy options in said destination locations in response to said busy option parameters.

52. The method according to claim 37, further comprising:

in step c), sending in said destination profile handling message a PTN number of calls parameter indicating for at least one destination location in said destination profile whether one or more than one call can be delivered to said destination location; and in step d), setting said PTN number of calls parameter in said indicated destination location.

53. The method according to claim 37, further comprising:

in step c), sending in said destination profile handling message one or more PTN number of calls flags indicating for at least one destination location in said destination profile whether a call is being delivered to said destination location or not; and in step d), setting said PTN number of calls flags in said indicated destination profiles.

54. The method according to claim 37, further comprising:

determining an active destination profile in said destination profile memory; and routing said incoming PTN call in accordance with the call distribution parameters set to said active destination profile.

55. The method according to claim 54, wherein:

said one or more handling parameters comprises one or more handling parameters selected from the group consisting of the following parameters: a handling parameter having selection and activation or deactivation options and a switching parameter; and said active destination profile is a default destination profile set by a default setting means of said destination profile handling means or an active destination profile selected by said handling parameter having selection and activation or deactivation options and or said switching parameter.

56. A method to control a personal communication system (PCS) server of a personal communication system providing PCS subscribers with personal telephone numbers comprising:

storing in a PCS destination profile memory in association with at least one personal telephone number (PTN) a number of destination profiles respectively consisting of a sequence of destination numbers indicating a number of predetermined destination locations;

providing a destination profile handling message for selectively handling one or more of said number of destination profiles in accordance with one or more handling parameters is provided to said PCS-server; and completing an incoming call directed to said PTN by routing the incoming call sequentially to destination locations in accordance with the sequence indicated in a destination profile until said call is abandoned or answered;

wherein one or more of said destination numbers have associated with them one or more call distribution parameters selected from a group of call distribution parameters that include a call origin parameter, a PTN number of calls parameter and a PTN number of calls flag that are received as a handling parameter in said destination profile handling message; and an incoming PTN call is routed to destination locations in said destination profile in accordance with the sequence indicated in a destination profile and said one or more call distribution parameters until said call is abandoned or answered.

57. The method according to claim 56, wherein:

said destination profile handling message is received from a PCS subscriber telephone which sets said one or more handling parameters.

58. The method according to claim 57, wherein:

said one or more handling parameters indicate said one or more call distribution parameters.

59. The method according to claim 57, wherein:

said one or more handling parameters comprises one or more handling parameters selected from the group consisting of the following parameters: a selection and activation or deactivation handling parameter and a switching parameter.

60. The method according to claim 56, further comprising:

sending said destination profile handling message by said PCS communication system which sets said one or more handling parameters in accordance with operating conditions of said PCS system and or a telephone system connected to said PCS system.

61. A method according to claim 60, wherein:

said one or more handling parameters indicate said one or more call distribution parameters.

62. The method according to claim 56, wherein:

said call distribution parameters are selected from one or more parameters selected from the group consisting of a call origin parameter, a teleservice-type parameter, a busy option parameter, a PTN number of calls parameter and a PTN number of calls flag.

63. The method according to claim 62, wherein:

said one or more handling parameters indicate said one or more call distribution parameters; and several call distribution parameters are associated with said destination number and an incoming PTN call is routed to destination locations in said destination profile in accordance with the sequence indicated in said destination profile and a logical combination of said call distribution parameters.

64. The method according to claim 63, wherein said call handling parameter also indicates the logical combination.

65. The method according to claim 62, further comprising:

comparing a call origin of the incoming PTN call with the set call origin parameter at said destination numbers; and selecting a next destination location in the destination profile if the call origin and the call origin parameter do not match and routing the PTN call to the destination location when they match.

66. The method according to claim 62, further comprising:

comparing a teleservice type of the incoming PTN call with the set teleservice-type parameter at said destination number; and selecting a next destination location in the destination profile if the teleservice type and the teleservice-type parameter do not match and routing the PTN call to the destination location when they match.

67. The method according to claim 65, wherein:

the call origin and or the teleservice-type of the PTN call is screened by the telephone system and provided to said PCS server during call setup.

68. The method according to claim 62, further comprising:

determining whether a present destination location to which the incoming PTN call is to be routed is busy or not; and routing said call to a next destination location as indicated by the busy option parameter at the present destination location if said present destination location is busy and said busy option parameter indicates a next destination location, or returning a busy indication to the calling subscriber if said present destination location is busy and said busy option parameter indicates the issuance of a busy indication.

69. The method according to claim 62, further comprising:

determining whether a call is already being delivered to a destination location to which said incoming PTN call is to be delivered, setting said PTN number of calls flag when a call is being delivered to said destination location and resetting said flag if no call is being delivered; and routing said incoming PTN call to said destination location if said PTN number of calls flag is set or to the next destination location in the destination profile if said PTN number of calls flag is not set.

70. The method according to claim 62, further comprising:

determining whether a call is already being delivered to a destination location to which said incoming PTN call is to be delivered, setting said PTN number of calls flag when a call is being delivered to said destination location and resetting said flag if no call is being delivered;

routing said incoming PTN call to said destination location if said PTN number of calls flag is set or to the next destination location in the destination profile if said PTN number of calls flag is not set;

determining on the basis of a set PTN number of call parameter whether one or more than one call can be delivered to a desired destination location; and routing said incoming PTN call to said destination location if said PTN number of calls parameter indicates that more than one call can be delivered to said destination location, or to the next destination location in the destination profile if said PTN number of calls parameter indicates that only one call can be delivered to said destination location and said PTN number of calls flag is set.

71. The method according to claim 56, further comprising:

determining an active destination profile in said destination profile memory; and routing said incoming PTN call in accordance with the call distribution parameters set to said active destination profile.

* * * * *

UNITED STATES PATENT AND TRADEMARK OFFICE
CERTIFICATE OF CORRECTION

PATENT NO. : 7,215,753 B2  Page 1 of 2
APPLICATION NO. : 09/973824
DATED : May 8, 2007
INVENTOR(S) : Parra Moyano et al.

It is certified that error appears in the above-identified patent and that said Letters Patent is hereby corrected as shown below:

In Fig. 5a, Sheet 8 of 19, in Box "VOICE", Line 1, delete "VOISE" and insert -- VOICE --, therefor.

In Fig. 5a, Sheet 8 of 19, below Box "PCS-TEL", Line 2, delete "TELEPHON-" and insert -- TELEPHONE --, therefor.

In Fig. 7, Sheet 11 of 19, in Box "ST22", Line 2, delete "THE" and insert -- BE --, therefor.`

In Fig. 7a, Sheet 12 of 19, in Box "ST33", Line 2, delete "PROFILS" and insert -- PROFILES --, therefor.

In Fig. 8, Sheet 13 of 19, under "BOP PARAMETER", Line 3, delete "GIRE" and insert -- GIVE --, therefor.

In Fig. 12a, Sheet 18 of 19, above Box "SC4", delete "CLAIM 27" and insert -- CLAIM 25 --, therefor.

In Fig. 12a, Sheet 18 of 19, above Box "SC5", delete "CLAIM 28" and insert -- CLAIM 26 --, therefor.

In Fig. 12a, Sheet 18 of 19, above Box "SC6", delete "CLAIM 29" and insert -- CLAIM 27 --, therefor.

In Fig. 12a, Sheet 18 of 19, in Box "SC6", Line 1, delete "PREVOIS" and insert -- PREVIOUS --, therefor.

In Fig. 12a, Sheet 18 of 19, in Box "SC6", Line 2, delete "DELIVERD" and insert -- DELIVERED --, therefor.

In Fig. 12a, Sheet 18 of 19, above Box "SC7", delete "CLAIM 30" and insert -- CLAIM 28 --, therefor.

In Fig. 12a, Sheet 18 of 19, above Box "SC9", delete "CLAIM 31" and insert -- CLAIM 29 --, therefor.

Signed and Sealed this

Twenty-seventh Day of July, 2010

David J. Kappos
*Director of the United States Patent and Trademark Office*

In Fig. 12b, Sheet 19 of 19, in Box "SC13", Line 1, delete "PRETERMINED" and insert -- PREDETERMINED --, therefor.

In Fig. 12b, Sheet 19 of 19, above Box "SC14", delete "CLAIM 31" and insert -- CLAIM 29 --, therefor.

In Fig. 12b, Sheet 19 of 19, in Box "SC14", Line 1, delete "SUPPLED" and insert -- SUPPLIED --, therefor.

In Fig. 12b, Sheet 19 of 19, above Box "SC16", delete "CLAIM 31" and insert -- CLAIM 29 --, therefor.

In Fig. 12b, Sheet 19 of 19, above Box "SC18", delete "CLAIM 31" and insert -- CLAIM 29 --, therefor.

In Fig. 12b, Sheet 19 of 19, above Box "SC19", delete "CLAIM 31" and insert -- CLAIM 29 --, therefor.

In Column 9, Line 17, delete "PTNS" and insert -- PTNs --, therefor.

In Column 16, Line 3, delete "PTNS" and insert -- PTNs --, therefor.

In Column 36, Line 51, in Claim 19, after "claim 18" insert -- , --.

In Column 37, Line 21, in Claim 26, delete "Several" and insert -- several --, therefor.

In Column 37, Line 31, in Claim 27, after "means" delete ":" and insert -- ; --, therefor.

In Column 39, Line 40, in Claim 38, after "or" delete "deactivation".